US011235202B2

(12) United States Patent
Connell

(10) Patent No.: US 11,235,202 B2
(45) Date of Patent: Feb. 1, 2022

(54) CARABINER RETRIEVAL DEVICES, CARABINERS, AND METHODS OF USE

(71) Applicant: DC MOUNTAINEERING L.C.C., Provo, UT (US)

(72) Inventor: Dallin John Connell, Provo, UT (US)

(73) Assignee: DC MOUNTAINEERING L.C.C., Provo, UT (US)

(*) Notice: Subject to any disclaimer, the term of this patent is extended or adjusted under 35 U.S.C. 154(b) by 0 days.

(21) Appl. No.: 16/647,934

(22) PCT Filed: Jun. 20, 2018

(86) PCT No.: PCT/US2018/038499
§ 371 (c)(1),
(2) Date: Mar. 17, 2020

(87) PCT Pub. No.: WO2019/059978
PCT Pub. Date: Mar. 28, 2019

(65) Prior Publication Data
US 2020/0261772 A1    Aug. 20, 2020

Related U.S. Application Data

(60) Provisional application No. 62/561,643, filed on Sep. 21, 2017.

(51) Int. Cl.
*A63B 29/02*    (2006.01)
*F16B 45/02*    (2006.01)

(52) U.S. Cl.
CPC ............ *A63B 29/02* (2013.01); *F16B 45/021* (2021.05)

(58) Field of Classification Search
CPC ........... A63B 29/02; F16B 2/12; F16B 45/025
See application file for complete search history.

(56) References Cited

U.S. PATENT DOCUMENTS 4,595,223 A * 6/1986 Hawie ........................ B25J 1/04
294/175
4,751,892 A * 6/1988 Sechel ..................... B63B 21/00
114/221 R (Continued)

OTHER PUBLICATIONS

International Search Report and Written Opinion for International Application No. PCT/US2018/038499 dated Sep. 11, 2018.

(Continued)

*Primary Examiner* — David M Upchurch
(74) *Attorney, Agent, or Firm* — Dorsey & Whitney LLP

(57) ABSTRACT

Embodiments disclosed herein relate to carabiners, carabiner retrieval devices and systems, and methods of retrieving a carabiner. In an embodiment, a carabiner retrieval device includes a neck, a retention device, and a retrieval cord retention structure. The neck has a length and includes a first end spaced from a second end along the length. The retention device extends from the first end of the neck at an obtuse angle relative to the length of the neck, and is configured to be attached to a gate of a carabiner. The retrieval cord retention structure extends from the second end of the neck, and is configured to retain a retrieval cord. When the retrieval cord is coupled to the retrieval cord retention structure and the retrieval cord retention device is attached to the gate of the carabiner, the gate opens responsive to the retrieval cord being pulled in a predetermined direction.

30 Claims, 17 Drawing Sheets

(56) References Cited

U.S. PATENT DOCUMENTS

| | | | | |
|---|---|---|---|---|
| 5,005,266 A * | 4/1991 | Fister | ............. | F16B 45/02 24/599.8 |
| 5,820,181 A * | 10/1998 | Le Noach | ............. | B63B 21/54 294/82.19 |
| 7,216,906 B2 | 5/2007 | Barrett | | |
| 7,571,944 B2 * | 8/2009 | Mortensen | ............. | A63B 29/02 294/211 |
| 8,398,134 B1 * | 3/2013 | Mortensen | ............. | A62B 35/0075 294/191 |
| 8,443,747 B1 * | 5/2013 | Cardarelli | ............. | B63B 21/54 114/221 R |
| 8,905,449 B2 * | 12/2014 | Calvert | ............. | F16B 45/025 294/82.31 |
| 2002/0148093 A1 * | 10/2002 | AmRhein | ............. | F16B 45/025 29/450 |
| 2005/0183904 A1 | 8/2005 | Bacalso | | |
| 2005/0275230 A1 | 12/2005 | Barrett | | |
| 2006/0272595 A1 * | 12/2006 | Edwards | ............. | A01K 27/008 119/795 |
| 2012/0317761 A1 * | 12/2012 | Tardif | ............. | F16B 45/02 24/599.5 |
| 2013/0247339 A1 * | 9/2013 | Wurzer | ............. | F16B 45/06 24/600.1 |
| 2016/0281766 A1 * | 9/2016 | Moine | ............. | A62B 35/0037 |
| 2018/0216700 A1 * | 8/2018 | Horgan | ............. | F16G 11/046 |
| 2018/0283439 A1 * | 10/2018 | Jones | ............. | A62B 35/0043 |
| 2018/0347665 A1 * | 12/2018 | LeBeau | ............. | F16G 11/143 |

OTHER PUBLICATIONS

U.S. Appl. No. 62/561,643, filed Sep. 21, 2017.

"The Firefly", https://dcmountaineering.com/, last accessed Oct. 2, 2018, Oct. 12, 2017.

"The Firefly: Crush Climbing Projects and Never Leave Gear", https://www.kickstarter.com/projects/1902167602/the-firefly-recover-your-lost-climbing-gear, Kickstarter—last accessed Oct. 2, 2018, Oct. 26, 2017.

* cited by examiner

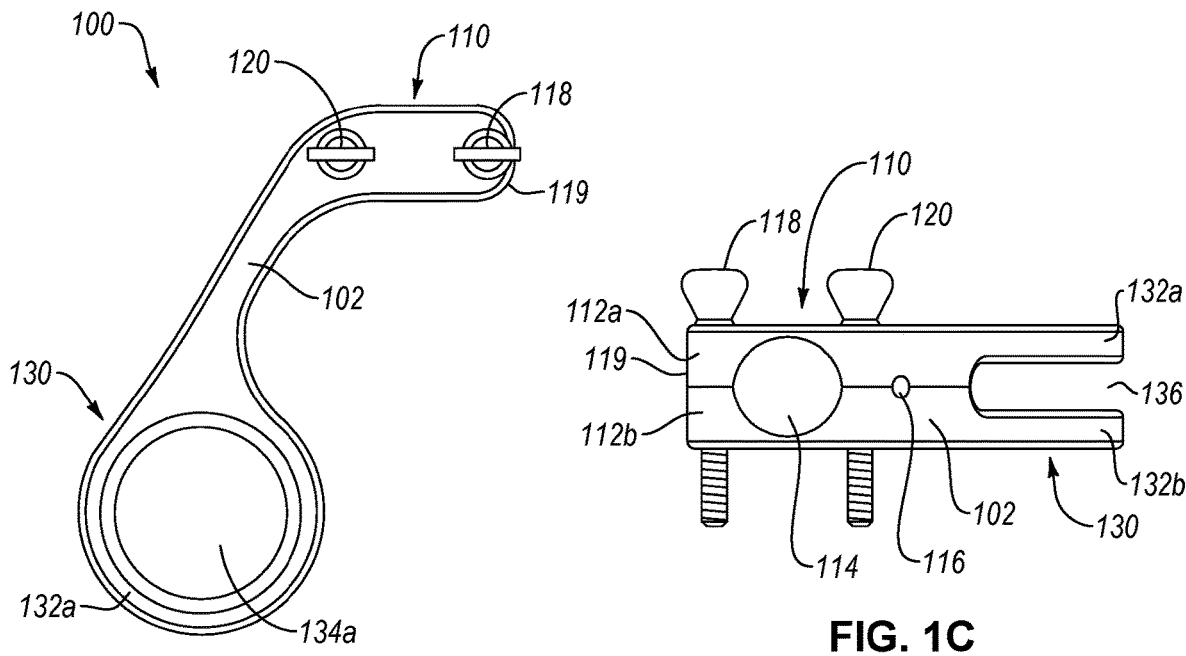
FIG. 1B
FIG. 1C
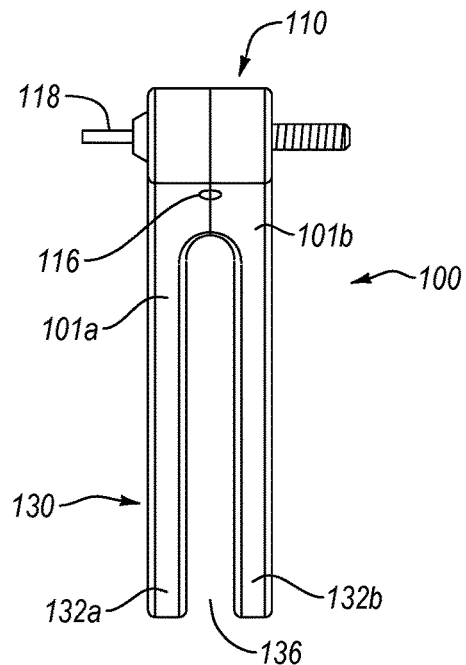
FIG. 1D

CARABINER RETRIEVAL DEVICES, CARABINERS, AND METHODS OF USE

CROSS-REFERENCE TO RELATED APPLICATIONS

This application is a U.S. National Stage of PCT International Application No. PCT/US2018/038499 filed on 20 Jun. 2018, which claims priority to U.S. Provisional Application No. 62/561,643 filed on 21 Sep. 2017, the disclosure of each of which is incorporated herein, in its entirety, by this reference.

BACKGROUND

As climbers ascend on a climbing route, the climbers typically removably couple one or more carabiners to devices attached to the wall, such as climbing hangers or anchors attached to a rock wall. Coupling of carabiners to devices attached to the wall allow climbers to safely climb the wall.

Climbers, however, are often unable to complete a climb. When a climber is unable to complete the climb, the climber is typically required to leave the carabiner in the nearest device attached to the wall in order for the climber to safely repel or lower down the wall. Once on the ground, the climber typically is unable to retrieve the carabiner (or other equipment coupled to the device attached to the wall), and the climber is forced to leave equipment on the wall.

SUMMARY

Embodiments disclosed herein relate to carabiners, carabiner retrieval devices, carabiner retrieval systems, and methods of retrieving a carabiner from a climbing route that allow a user to, from the ground or other desired location, retrieve a carabiner attached to a device on a climbing route. In an embodiment, a carabiner retrieval device is disclosed. The carabiner retrieval device includes a neck having a length, a retention device, and a retrieval cord retention structure. The neck includes a first end spaced from a second end along the length. The retention device extends from the first end of the neck at an obtuse angle relative to the length of the neck. The retention device is configured to be attached to a gate of a carabiner. The retrieval cord retention structure extends from the second end of the neck, and is configured to retain a retrieval cord. When the retrieval cord is coupled to the retrieval cord retention structure and the retrieval cord retention device is attached to the gate of the carabiner, the gate opens responsive to the retrieval cord being pulled in a predetermined direction.

In an embodiment, a carabiner retrieval system is disclosed. The carabiner retrieval system includes a carabiner including a gate, a carabiner retrieval device, and a retrieval cord. The carabiner retrieval device includes a neck having a length, a retention device, and a retrieval cord retention structure. The neck includes a first end spaced from a second end along the length. The retention device extends from the first end of the neck at an obtuse angle relative to the length of the neck, and is configured to be attached to a gate of a carabiner. The retrieval cord retention structure extends from the second end of the neck, and is configured to retain a retrieval cord. The retrieval cord is coupled to the retrieval cord retention structure. The gate opens responsive to the retrieval cord being pulled in a predetermined direction.

In an embodiment, a method of retrieving a carabiner from a device on a climbing route is disclosed. The method includes an act of coupling a retention device of a carabiner retrieval device to a gate of the carabiner coupled to the device on the climbing route. The method also includes an act of inserting a retrieval cord through an opening in the device on the climbing route. The method also includes an act of coupling the retrieval cord to a retrieval cord retention structure of the carabiner retrieval device. The method also includes an act of applying a force to the carabiner in a direction away from the device on the climbing route with a climbing rope coupled to the carabiner. The method also includes an act of, while applying the force to the carabiner, pulling the retrieval cord effective to cause the gate to open and pass the device on the climbing route through a gate opening on the carabiner to uncouple the carabiner from the device on the climbing route. The method also includes an act of pulling the climbing rope in the direction away from the device on the climbing route to retrieve the carabiner, the retrieval cord sliding through the device on the climbing route as the climbing rope is pulled in the direction away from the device on the climbing route.

In an embodiment, a carabiner is disclosed. The carabiner includes a carabiner body and a pivotable gate biased to a closed position. The gate includes a retrieval cord retention structure configured to couple a retrieval cord to the carabiner. When the retrieval cord is coupled to the retrieval cord retention structure, the gate opens responsive to the retrieval cord being pulled in a predetermined direction.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 1B is a side view of the carabiner retrieval device of FIG. 1A.

FIG. 1C is a top view of the carabiner retrieval device of FIG. 1A.

FIG. 1D is a front view of a carabiner retrieval device, according to an embodiment.

DETAILED DESCRIPTION

Figure 1A:
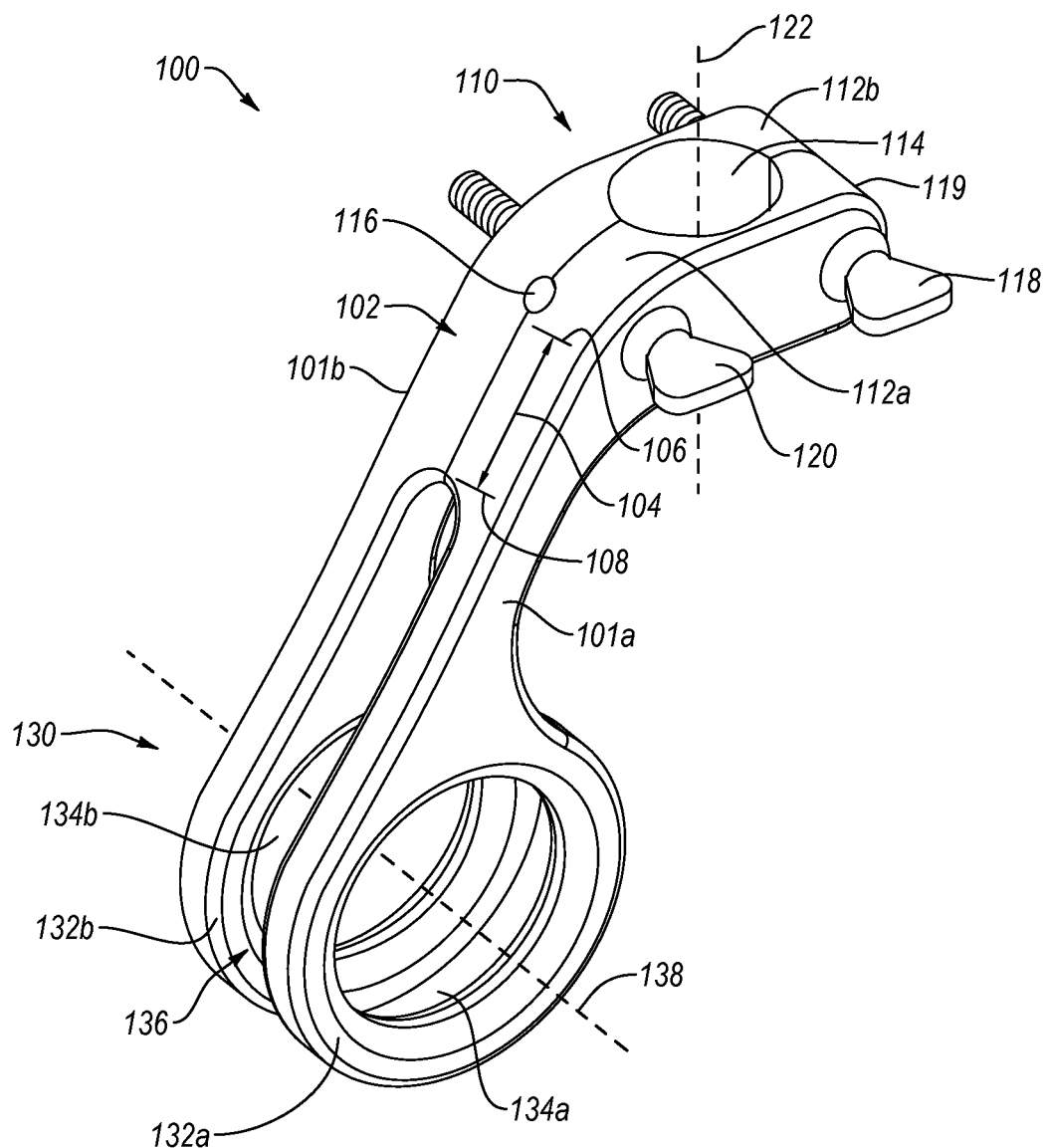
FIG. 1A is an isometric view of a carabiner retrieval device, according to an embodiment.

Embodiments disclosed herein relate to carabiners, carabiner retrieval devices, carabiner retrieval systems, and methods of retrieving a carabiner from a climbing route that allow a user to, from the ground, retrieve a carabiner attached to a device on a climbing route. For example, the climbing route may be a sport climbing route, a traditional rock climbing route, a mountaineering route, or other type of route or exposed situation. When climbers are unable to complete a climb on a climbing route, various embodiments of carabiner retrieval systems and methods described herein allow the climbers, from a distance (e.g., the ground or a ledge), to retrieve carabiners or other equipment coupled to a device attached to the climbing route. For example, a climber may reach a certain point on a rock wall and determine that he/she cannot complete the climb and must instead return to the ground. During the climb of the rock wall, the climber likely coupled a carabiner to an anchor, hanger, or other device attached to the rock wall. This coupling of the carabiner or other equipment to the anchor is used as the climber repels or otherwise descends down the rock wall to return to the ground. As shall be described in greater detail herein, various embodiments of the carabiner retrieval systems and methods described in this disclosure allow the climber to safely return to the ground or other desired location and then, from the ground or other desired location, retrieve the carabiner or other equipment coupled to the anchor on the rock wall. In other words, the climber is able to "clean the route" (remove all his/her gear from the wall) without having to untie the climbing rope and tie in again at multiple anchors or hangers.

A carabiner retrieval device can be used in various carabiner retrieval systems and methods. The carabiner retriever device includes a neck having a length, and the neck includes a first end spaced from a second end along the length of the neck. The carabiner retriever device also includes a retrieval cord retention structure extending from the second end of the neck. The retrieval cord retention structure is configured to retain a retrieval cord. In some embodiments, the carabiner retrieval device also can include a retention device extending from the first end of the neck at an obtuse angle relative to the length of the neck. The retention device is configured to be attached to a gate of a carabiner. In other embodiments, the carabiner retrieval device can be devoid of the retention device, and instead be formed integrally with a gate of a carabiner. In these embodiments, when the retrieval cord is coupled to the retrieval cord retention structure, the gate opens responsive to the retrieval cord being pulled in a predetermined direction such as downwardly toward the ground.

FIGS. 1A-D are various views of an embodiment of a carabiner retrieval device 100. The carabiner retrieval device 100 includes a neck 102, a retention device 110, and a retrieval cord retention structure 130. The neck 102 exhibits a length 104, and includes a first end 106 spaced from a second end along the length 104 of the neck 102.

The retention device 110 is configured to be attached to a gate of a carabiner and extends from the first end 106 of the neck 102 at an obtuse angle 112 (shown in FIG. 1B) relative to the length 104 of the neck 102. Similarly, the length 104 of the neck 102 may form an acute angle relative to an axis 122 of a bore 114 of the retention device. In other embodiments, the length 104 of the neck 102 may be substantially parallel to and spaced from the axis 122 of the bore 114 in the retention device 110.

In the carabiner retrieval device shown in FIGS. 1A-1D, the retention device 110 includes two arm members 112a and 112b. A first arm member 112a may include one or more grooves defined by one or more arcs and complementary to one or more grooves defined by one or more arcs in the second arm member 112b. When the first arm member 112a is aligned with the second arm member 112b, the one or more aligned grooves of each arm member 112a and 112b are positioned complementary to form one or more bores in the retention device 110. The one or more bores are sized to receive at least a portion of a gate of carabiner therein. In the carabiner retrieval device 100 shown in FIGS. 1A-1D, the retention device includes a first bore 114 and a second bore 116. The first bore 114 is sized to receive and receive a solid gate of the carabiner (shown in FIG. 2B). The second bore 116 is smaller than the first bore 114 and is sized to receive one wire of two wires of a wire gate (shown in FIG. 2A).

Various embodiments of a carabiner retrieval device also may include one or more tightening screws or bolts. The one or more tightening screws extend through the two arm members 112a and 112b and are configured to tighten at least one bore of the one or more bores around at least a portion of the gate. One of the two arm members 112a or 112b may include one or more threaded openings complementary to the threading on the one or more tightening screws or bolts. In the carabiner retrieval device 100 shown in FIGS. 1A-1D, the retention device 110 includes a first tightening screw 118 and a second tightening screw 120. The first tightening screw 118 is positioned between the first bore 114 and a terminating end 119 of the retention device 110. The second tightening screw 120 is positioned between the first bore 114 and the second bore 116. Either or both the first tightening screw 118 and the second tightening screw 120 are positioned to tighten the first bore 114 around the solid gate of a carabiner. The second tightening screw 120 is positioned to tighten the second bore 114 around one wire of a wire gate of a carabiner. In alternative embodiments, a rubber insert can be positioned in or coated on an interior surface defining the first bore 114 or the second bore 116 to create a friction bond to secure the retention device 110 around the gate of the carabiner.

The retrieval cord retention structure 130 extends from the second end 108 of the neck 102 and is configured to retain a retrieval cord. When the retrieval cord is coupled to the retrieval cord retention structure 130 and the retrieval cord retention device 110 is attached to the gate of the carabiner, the gate opens responsive to the retrieval cord being pulled in a predetermined direction.

In some embodiments, the retrieval cord retention structure 130 includes at least one ring 132 defining an opening 134 sized for a closeable loop to be coupled thereto. In the carabiner retrieval device 100 shown in FIGS. 1A-1D, the retrieval cord retention structure 130 includes two rings 132a and 132b. The two rings 132a and 132b each define a different opening 134a and 134b sized for a closeable loop to be coupled thereto. The closeable loop can include an additional carabiner or any other closeable loop. The retrieval cord retention structure also includes an axis 138 about which the rings 132a and 132b extend. The axis 138 is substantially perpendicular to the axis 122 of the first bore 114. The carabiner retrieval device 100 shown in FIGS. 1A-1D also includes a slot 136 positioned between the two rings 132a and 132b. The slot 136 may be sized for the retention cord to be coupled to the closeable loop within the slot 136 between the two rings 132a and 132b.

The carabiner retrieval device 100 can be formed of one integral piece, or two device pieces coupled together. The carabiner retrieval device shown in FIGS. 1A-D includes a first device piece 101a and a second device piece 101b. In such an embodiment, the retrieval cord retention structure 130 includes the first ring 132a on the first device piece 101a and the second ring 132b on the second device piece 101b, the neck 102 includes a portion of the first device piece 101a interfacing a portion of the second device piece 101b, and the retention device 100 includes the first arm member 112a on the first device piece 101a and the second arm member 112b on the second device piece 101b.

Figure 2A:
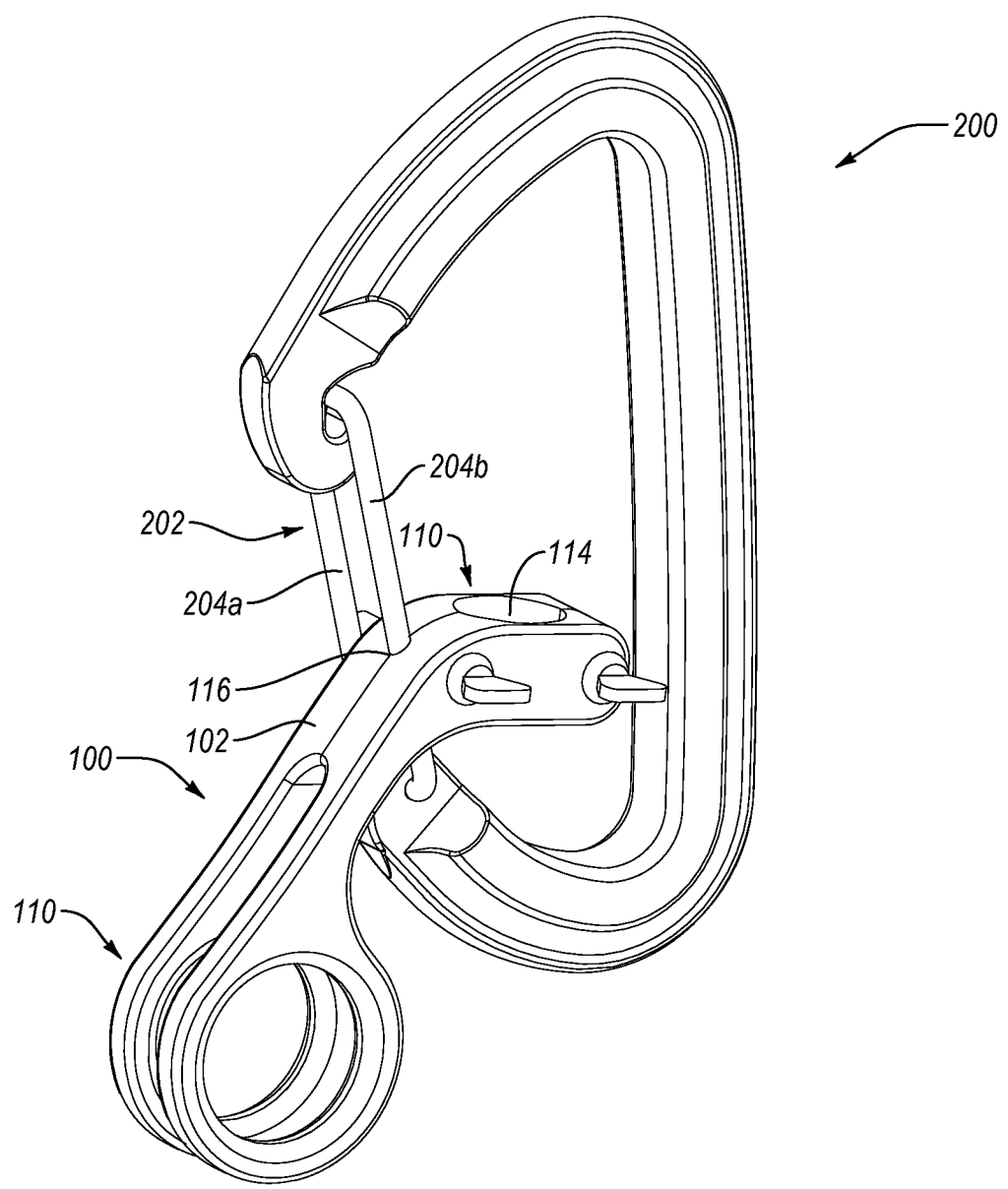
FIGS. 2A and 2B are isometric views of carabiner retrieval devices coupled to carabiners, according to various embodiments.

FIG. 2A is an isometric view of the carabiner retrieval device 100 removably coupled to a carabiner 200 having a wire gate 202. The wire gate 202 includes a first wire 204a and a second wire 204b. The carabiner 200 may include any carabiner known in the art having a wire gate. As illustrated in FIG. 2A, the second bore 116 of the carabiner retrieval device 100 is sized to receive the wire 204a or 204b of the wire gate 202 and the retention device 110 secures the wire 204a or 204b therein.

Figure 2B:
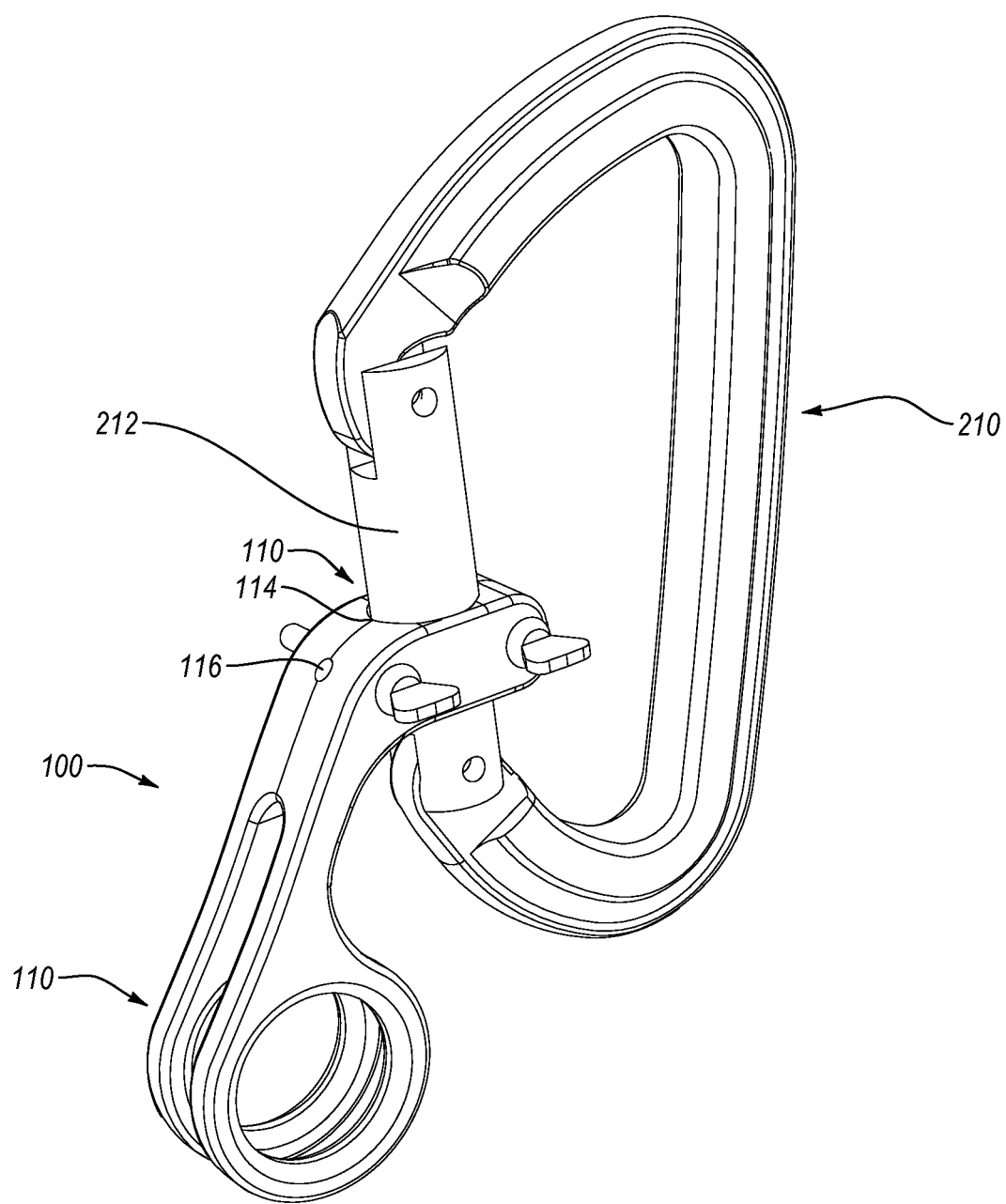

FIG. 2B is an isometric view of the carabiner retrieval device 100 removably coupled to a carabiner 210 having a solid gate 212. Although not shown in FIG. 2B, the solid gate may include a safety lock. The carabiner 210 may include any carabiner known in the art having a solid gate. As illustrated in FIG. 2B, the first bore 114 of the carabiner retrieval device 100 is sized to receive the solid gate 212 of the carabiner 210 and the retention device 110 secures the solid gate 212 therein.

A carabiner retrieval device, such as the carabiner retrieval device 100 shown in FIGS. 1A-1D can be used in a carabiner retrieval system. Carabiner retrieval systems include a carabiner, a carabiner retrieval device, and a retrieval cord. FIGS. 3A-3E illustrate an embodiment of a carabiner retrieval system 300 at various stages of operation. The carabiner retrieval system 300 includes a carabiner 210, a carabiner retrieval device 100, and a retrieval cord 304. The carabiner shown in FIGS. 3A-3E includes a solid gate 212. However, other carabiners, such as the carabiner 200 having the wire gate 202 (FIG. 2A) can be used in the carabiner retrieval system 300. In the carabiner retrieval system 300 shown in FIGS. 3A-3E, the carabiner 210 is attached to hanger 320 on the climbing route. In other carabiner retrieval systems, the carabiner may be attached to other devices on the climbing route, such as anchors, another carabiner, or another fixed point on the climbing route.

While the carabiner retrieval system 300 shown in FIGS. 3A-3E includes the carabiner retrieval device 100, other embodiments of a carabiner retrieval devices disclosed herein can be used in the carabiner retrieval system 300. Generally, the carabiner retrieval device of the carabiner retrieval system includes a neck, a retention device, and a retrieval cord retention structure. The neck has a length, and includes a first end spaced from a second end along the length. The retention device extends from the first end of the neck at an obtuse angle relative to the length of the neck. The retention device is configured to be attached to a gate of a carabiner. The retrieval cord retention structure extends from the second end of the neck, and is configured to retain a retrieval cord.

The retrieval cord 304 is coupled to the retrieval cord retention structure 130. In the carabiner retrieval system illustrated in FIGS. 3A-3E, the retrieval cord 304 includes a loop 306 coupled to the retrieval cord retention structure 130. More specifically, an additional carabiner 302 is coupled to the two rings 132a and 132b of the retrieval cord retention structure 130, and the retrieval cord 304 is coupled to the additional carabiner 302 in the slot 136 between the two rings 132a and 132b. In other embodiments, the retrieval cord 304 can be coupled to a retrieval cord retention structure having one or more rings formed integrally with the gate of the carabiner (see, for example, FIGS. 4A-C), coupled to a knob of a retrieval cord retention structure (see, for example, FIG. 4E), coupled to one or more rings of a retrieval cord retention structure substantially parallel to the retention device (see, for example, FIG. 4F), coupled to an anchor of a retrieval cord retention structure (see, for example, FIG. 4G), coupled to hook of a retrieval cord retention structure (see, for example, FIG. 4H), or coupled to a ring of a cam assembly retrieval cord retention structure (see, for example, FIG. 4J).

Figure 3A:
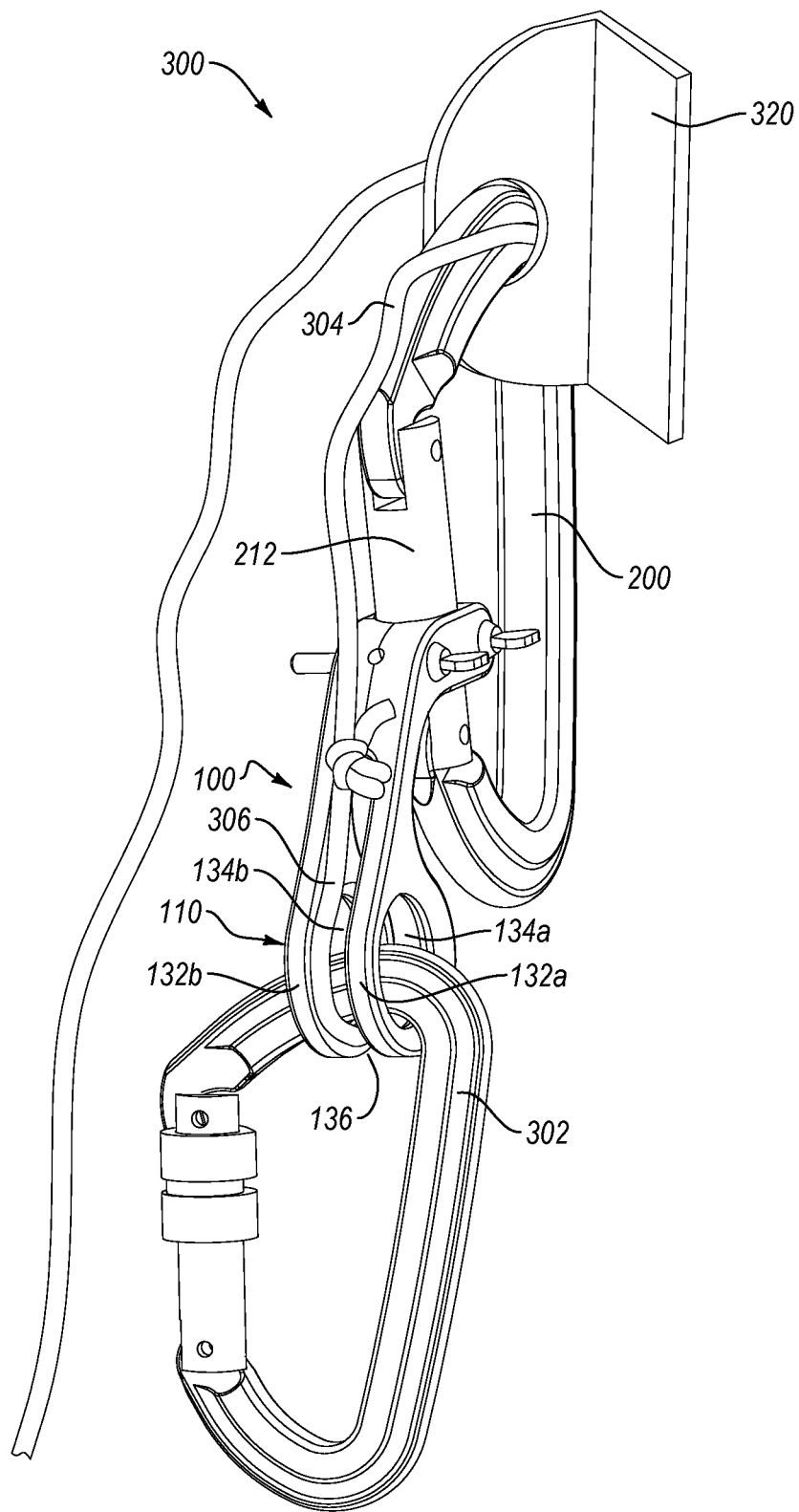
FIGS. 3A-3E are various isometric views of a carabiner retrieval system and different stages of operation, according to an embodiment.
Figure 3B:
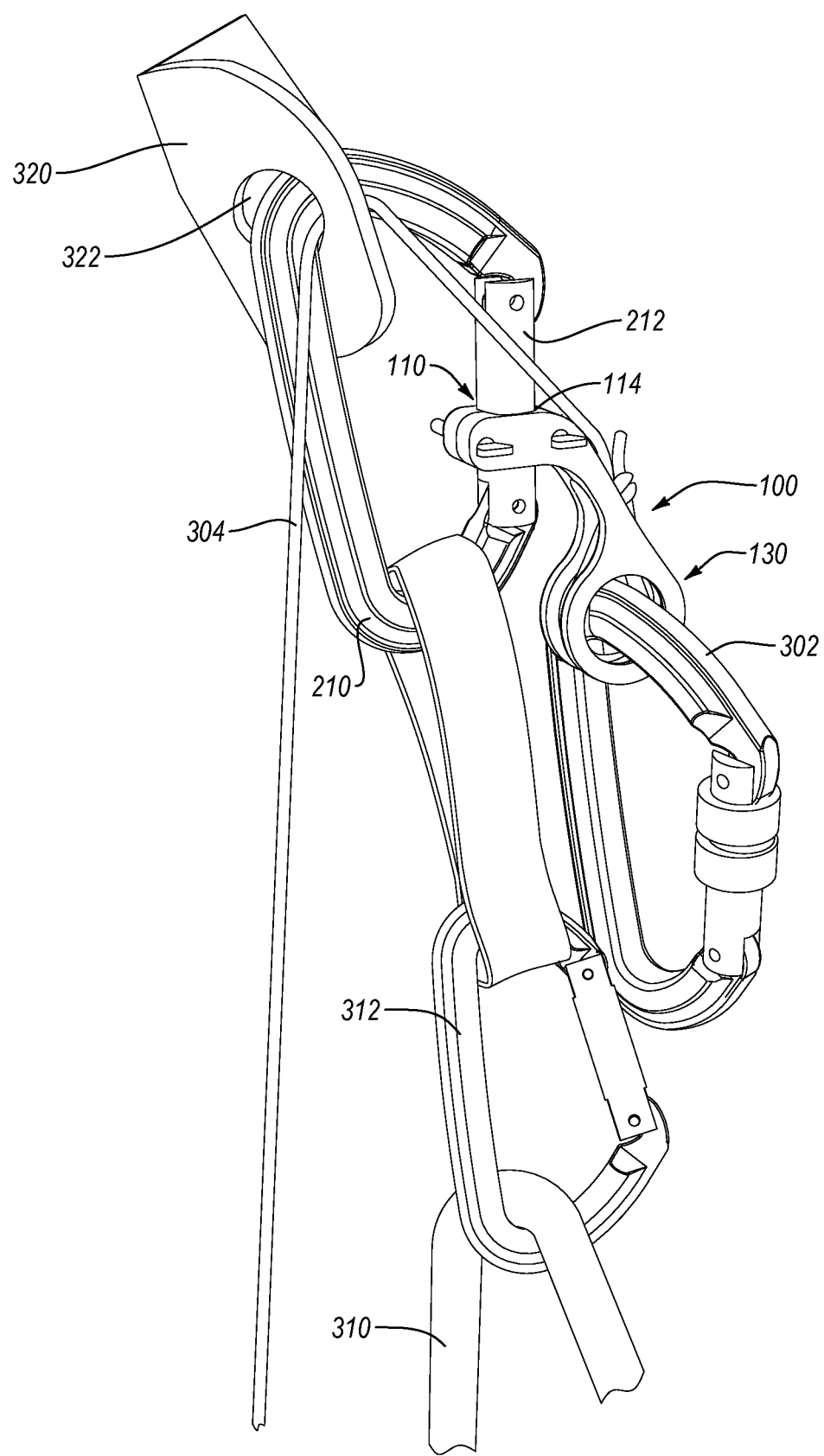
Figure 3C:
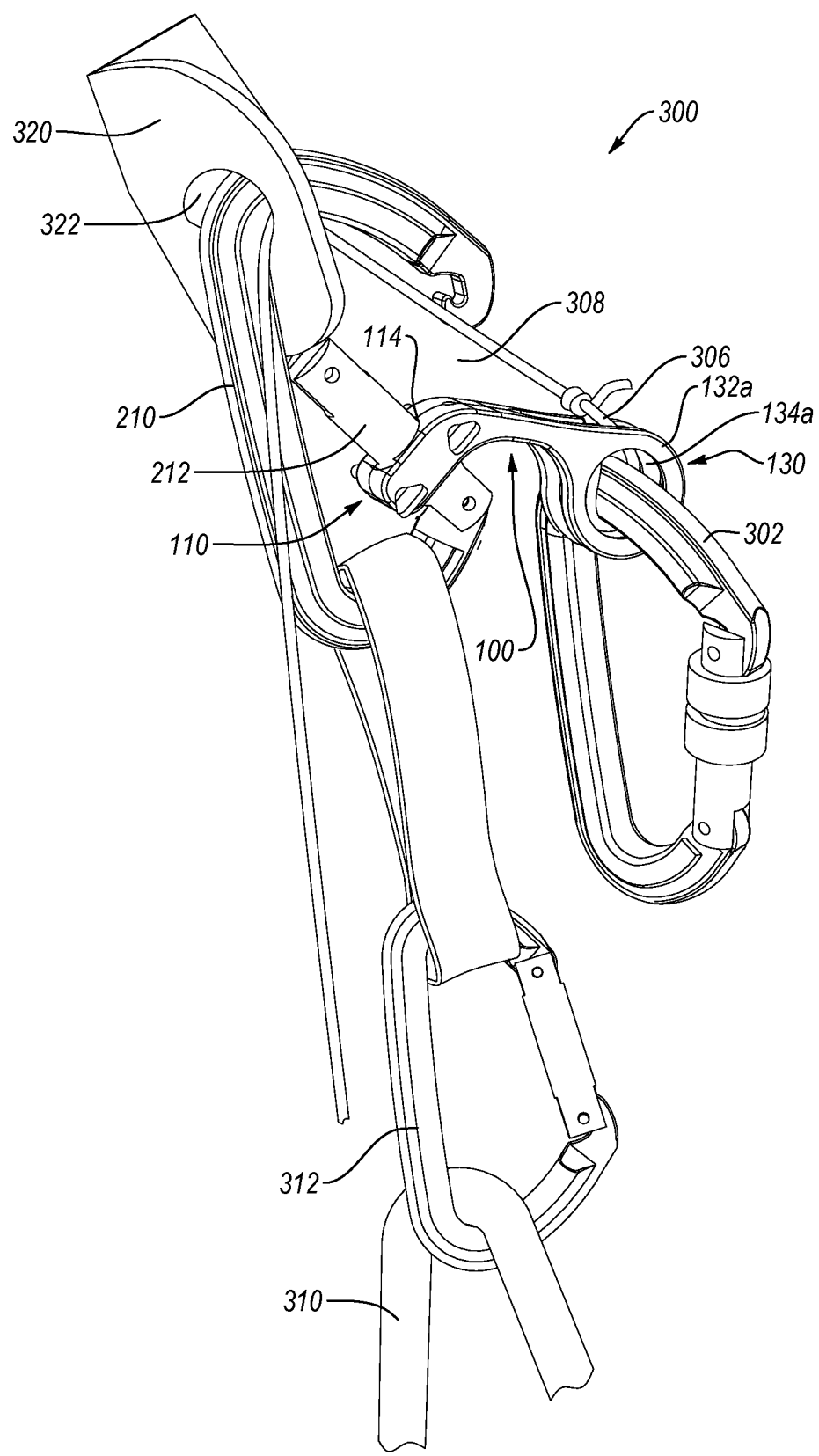

In operation of the carabiner retrieval system 300, as shown in FIGS. 3A and 3B, the carabiner 210 is removably coupled to a hanger 320 on a climbing route, the carabiner retrieval device 100 is coupled to the gate 212 of the carabiner 210, and the retrieval cord 304 is passed through an opening 322 in the hanger 320 then coupled to the retrieval cord retention structure 130. A climbing rope 310 also can be coupled to the carabiner 210. The climbing rope 310 can be coupled directly to the carabiner 210 or, as shown in FIGS. 3B-3E, slidably looped through a carabiner 312 or other device that is coupled to the carabiner 210. For example, in FIGS. 3B-3E, the carabiners 210 and 310 are part of a quick draw assembly, with the carabiner retrieval device 100 being coupled to the carabiner 210 attached to the hanger 320 and the climbing rope 310 passing through the carabiner 310. One end of the climbing rope 310 may be coupled to the climber's harness climbing the climbing route, and the other end of the climbing rope 310 may be coupled to or held by a belayer Turning to FIG. 3C, when a force is applied to the carabiner 210 in a direction downwardly away from the hanger 320 on the climbing route while pulling the retrieval cord 304, the gate 212 of the carabiner 210 is opened. The force may be applied to carabiner 210, for example, by pulling the climbing rope 310 from the ground. The force is sufficient to prevent the carabiner 210 from rotating within the hanger 320 before the gate 212 is opened.

Figure 3D:
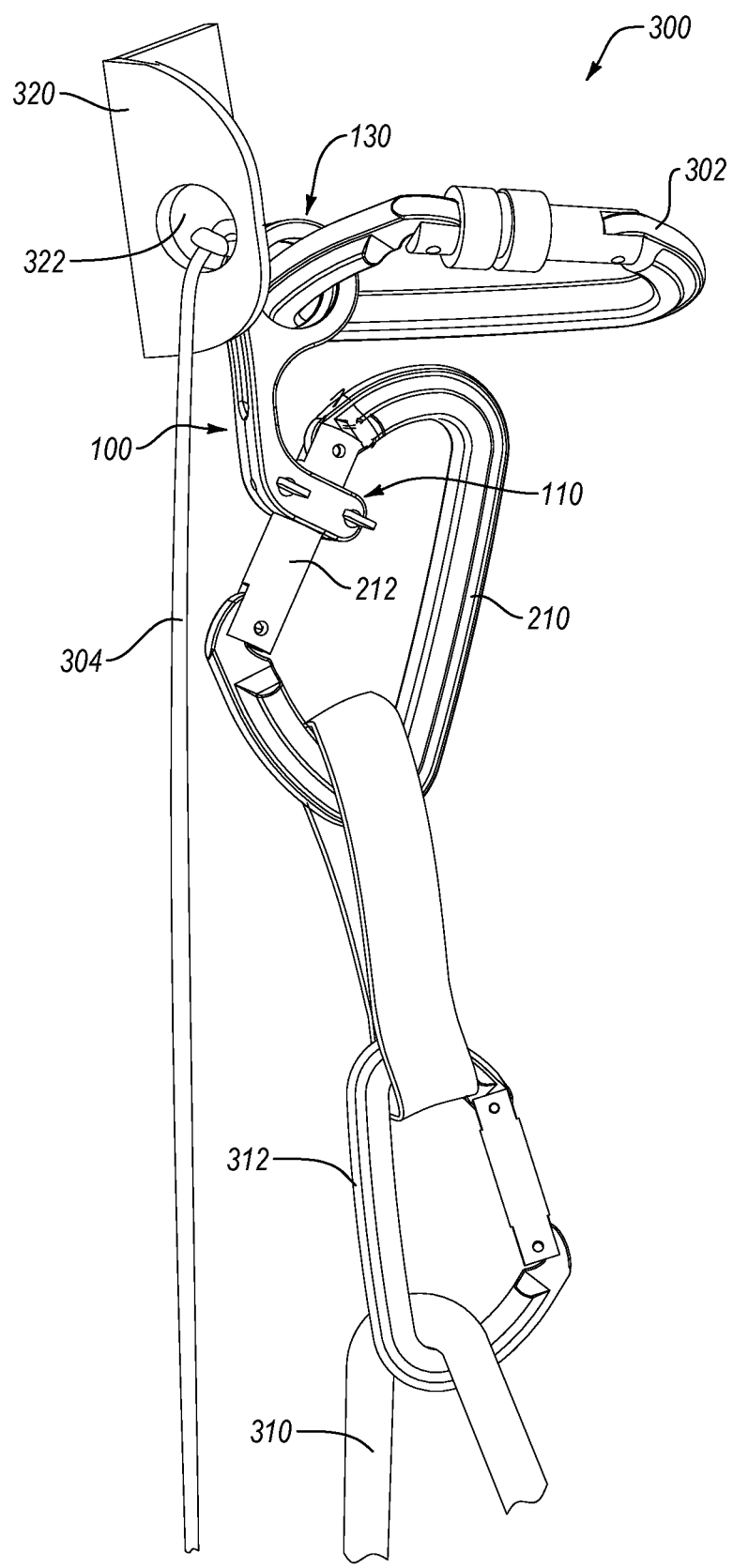

Turning now to FIG. 3D, as the retrieval cord 304 is continued to be pulled after causing the gate to open, a portion of the hanger 320 passes through a gate opening 308 of the carabiner 210. The force applied to the carabiner 210 by pulling the climbing rope 310 may be decreased or eliminated once the gate is open to allow the carabiner 210 to rotate as the retrieval cord is pulled. Once the portion of the hanger 320 passes through the gate opening 308 of the carabiner 210 to uncoupled the carabiner 210 from the hanger 320 on the climbing route, the gate 212 is biased to a closed position, leaving only the retrieval cord 304 passing through the opening 322 in the hanger 320.

Figure 3E:
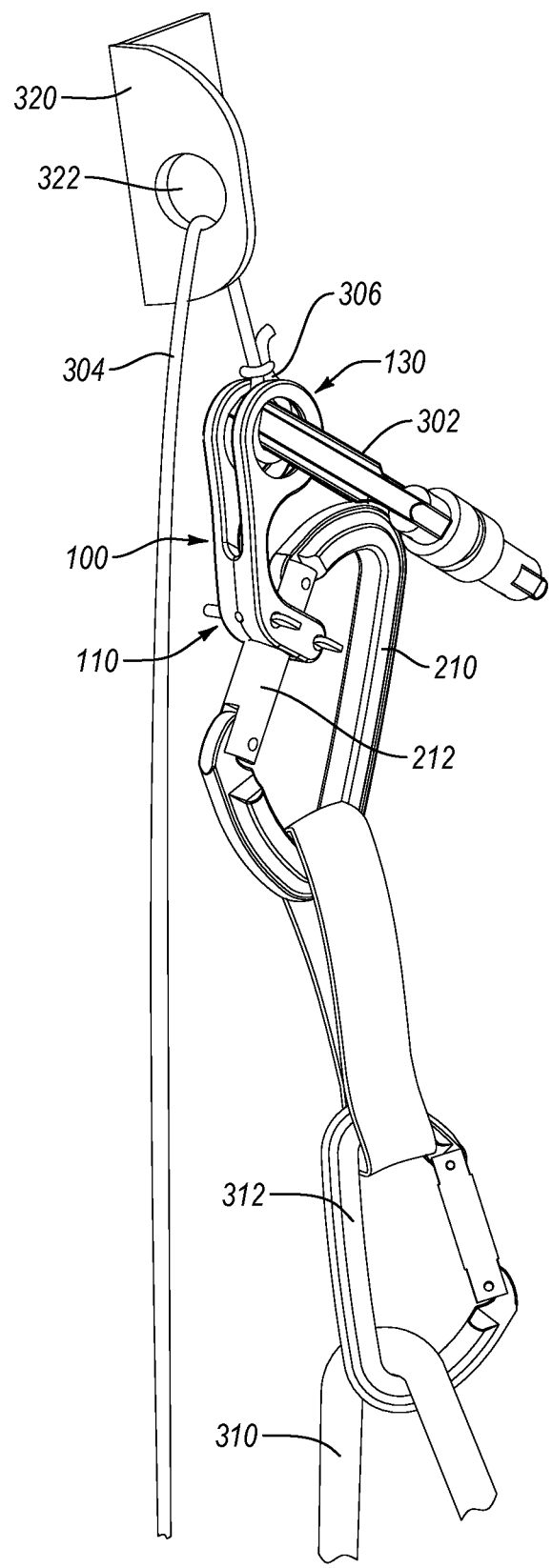

Turning now to FIG. 3E, the carabiner 210, the carabiner retrieval device 100, and any other equipment coupled thereto are lowered from the hanger 320 to the ground as the retrieval cord 304 passes through the opening 322 in the hanger 320. Once the carabiner 210, the carabiner retrieval device 100, and any other equipment is on the ground or in the hands of a person on the ground, the retrieval cord 304 may be pulled through the opening 322 in the hanger 320 to retrieve the retrieval cord 304.

While the carabiner retrieval device 100 is shown in the carabiner retrieval system 300, other embodiments of carabiner retrieval devices can be used in alternative or addition to the carabiner retrieval device 100. FIGS. 4A-4K illustrate different embodiments of carabiner retrieval devices that may be used in a number of different carabiner retrieval systems and methods.

Figure 4A:
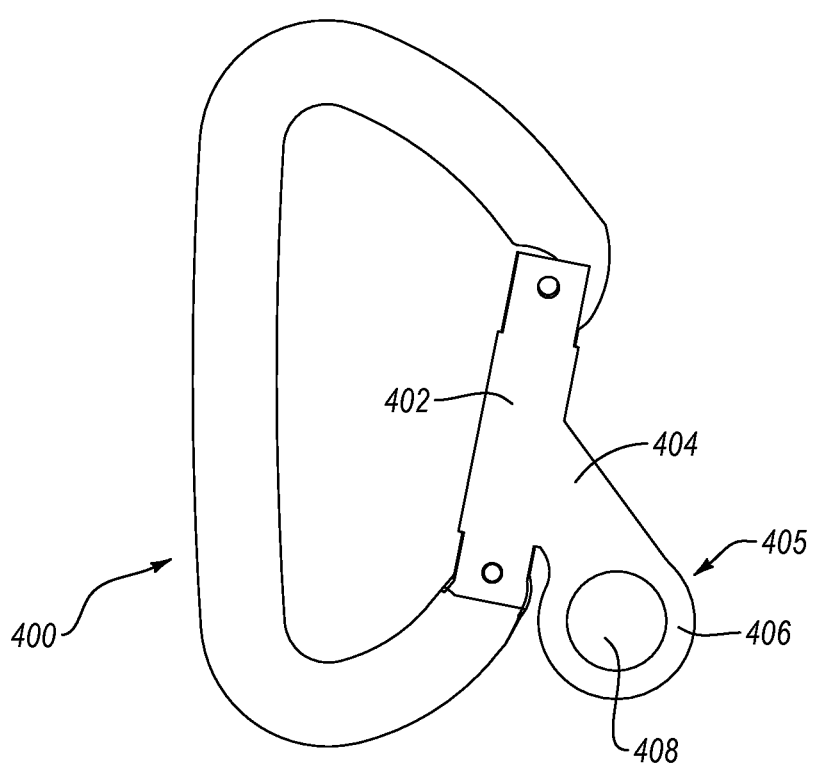
FIG. 4A is a side view of a carabiner, according to an embodiment.

In some embodiments, a carabiner retrieval device can be integrally formed with a gate of a carabiner, thus removing the need to couple a retention device of the carabiner retrieval device to the gate of the carabiner. FIG. 4A illustrates an embodiment of a carabiner 400 having a carabiner body and a pivotable gate 402 having a carabiner retrieval device integrally formed with the gate 402. The gate 402 can be biased to a closed positioned (shown in FIG. 4A). The gate 402 further includes a neck 404 extending outward from the gate 402, away from an inner area of the carabiner 400. In the carabiner 400 shown in FIG. 4A, the neck 404 forms an obtuse angle with an upper portion of the gate 402. In other embodiments, the neck of the carabiner can form different angles relative to the upper portion of the gate 402.

The gate 402 of the carabiner 400 further includes a retrieval cord retention structure 405 configured to couple to a retrieval cord to the carabiner 400. Similar to the retrieval cord retention structure 130 of the carabiner retrieval device 100, the retrieval cord structure 405 may include two rings 406 each defining an opening 408, and a slot positioned between the two rings 480. In other embodiments, the retrieval cord structure 405 may include one ring defining an opening. The rings 408 are also positioned such that each forms a plane that is substantially parallel to a plane formed by the body of the carabiner 400.

In operation, the carabiner 400 operates similar to the carabiner 210 and carabiner retrieval device 100 of the carabiner retrieval system 300, without the requirement to couple carabiner retrieval device to the carabiner 400.

Figure 4B:
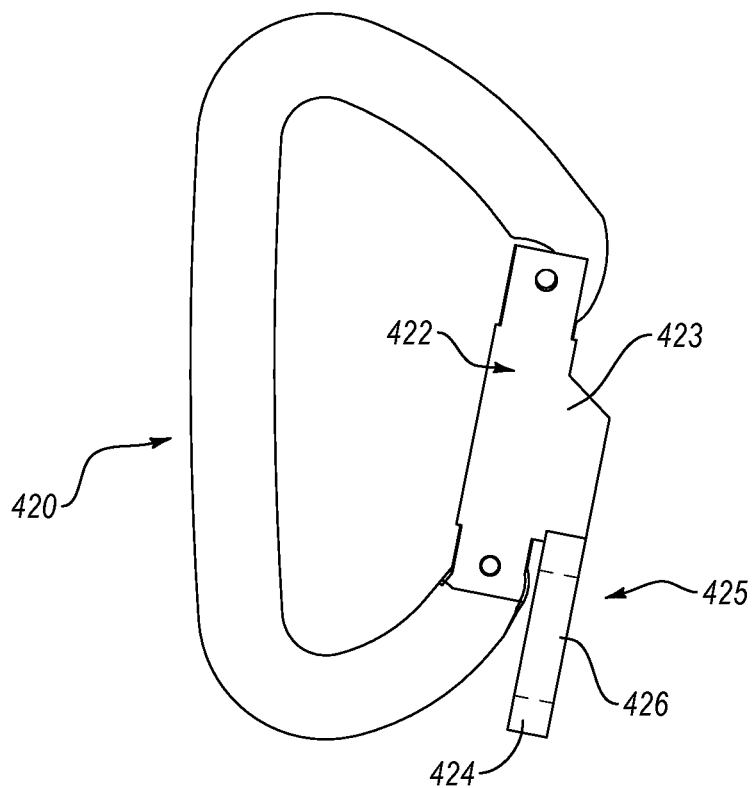
FIG. 4B is a side view of a carabiner, according to an embodiment.
Figure 4C:
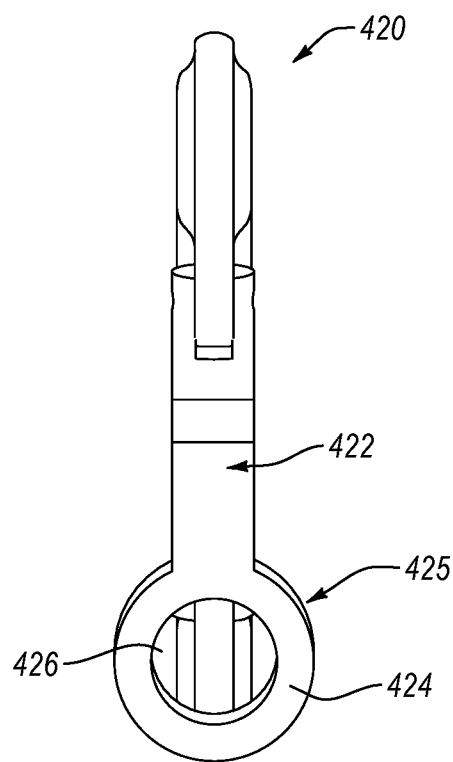
FIG. 4C is the front view of the carabiner shown in FIG. 4B.

FIGS. 4B and 4C illustrate an embodiment of a carabiner 420 having a carabiner body and a pivotable gate 422 having a carabiner retrieval device integrally formed with the gate 422. The gate 422 can be biased to a closed positioned (shown in FIG. 4C). The gate 422 further includes a neck 423 extending outward from the gate 422, away from an inner area of the carabiner 420. In the carabiner 420 shown in FIGS. 4B and 4C, the neck 423 is substantially parallel with an upper portion of the gate 422.

The gate 422 of the carabiner 420 further includes a retrieval cord retention structure 425 configured to couple to a retrieval cord to the carabiner 400. The retrieval cord retention structure 425 includes at least one ring 424 defining an opening 426. In other embodiments, the retrieval cord retention structure may include two rings each defining an opening, with a slot formed between the two rings. The at least one ring 424 is also positioned to form a plane that is substantially perpendicular to a plane formed by the body of the carabiner 420.

In operation, the carabiner 420 operates similar to the carabiner 210 and carabiner retrieval device 100 of the carabiner retrieval system 300, without the requirement to couple carabiner retrieval device to the carabiner 420.

Figure 4D:
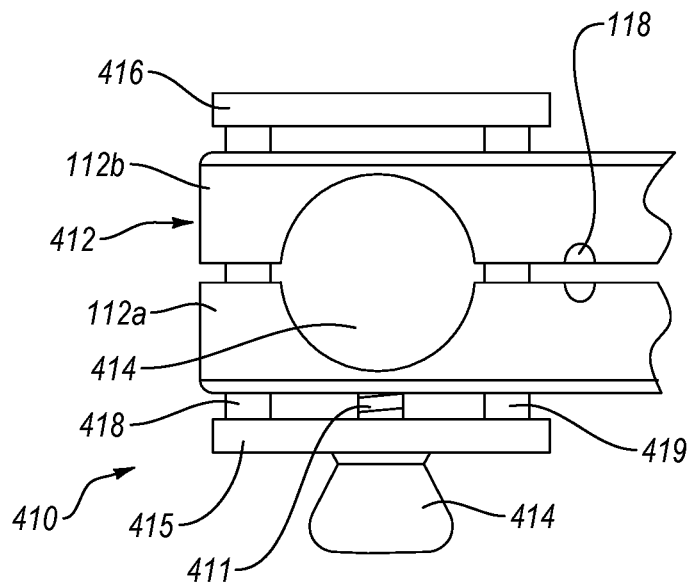
FIG. 4D is a top view of a retention device of a carabiner retrieval device, according to an embodiment.
Figure 4E:
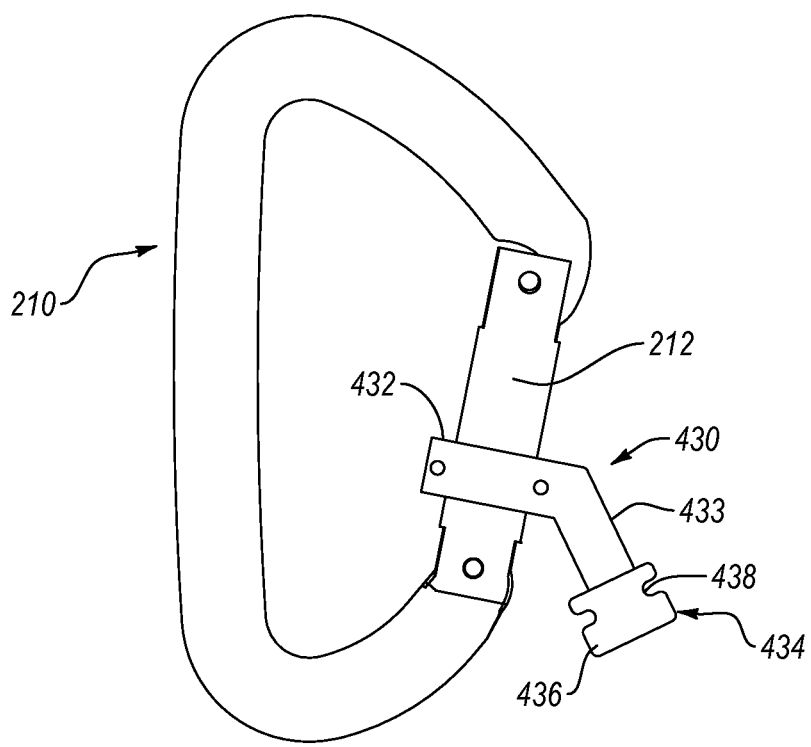
FIG. 4E is a side view of a carabiner retrieval device coupled to a carabiner, according to an embodiment.

FIG. 4E illustrates an embodiment carabiner retrieval device 430 coupled to a pivotable gate 212 of a carabiner 210. The carabiner retrieval device 430 includes a retention device 432, a neck 433, and a retrieval cord retention structure 434. The retention device 432 and neck 433 may include any retention devices and necks described elsewhere in the document. In some embodiments, the carabiner retrieval device 430 can be formed integrally with the gate 212 of the carabiner 210.

The retrieval cord retention structure 434 of the carabiner retrieval device 430 includes a knob 436 distal to the retention device 432 or the gate 212. The knob 436 is configured to allow a user to tie a retrieval cord around the knob 436. The knob 436 of the retrieval cord retention structure 434 includes a recess 438 on a periphery of the knob 436. The recess may be sized to interface at least a portion of the retrieval cord, thereby helping to securely fasten the retrieval cord to the retrieval cord retention structure 434.

In operation, the carabiner retrieval device 430 coupled to the gate 212 of the carabiner 400 operates similar to the carabiner 210 and carabiner retrieval device 100 of the carabiner retrieval system 300. The retrieval cord 304, however, may be coupled to the retrieval cord retention structure 434, however, without an additional carabiner or closeable loop. Instead, the retrieval cord 304 may be coupled directly to the knob 436, as described above.

Figure 4F:
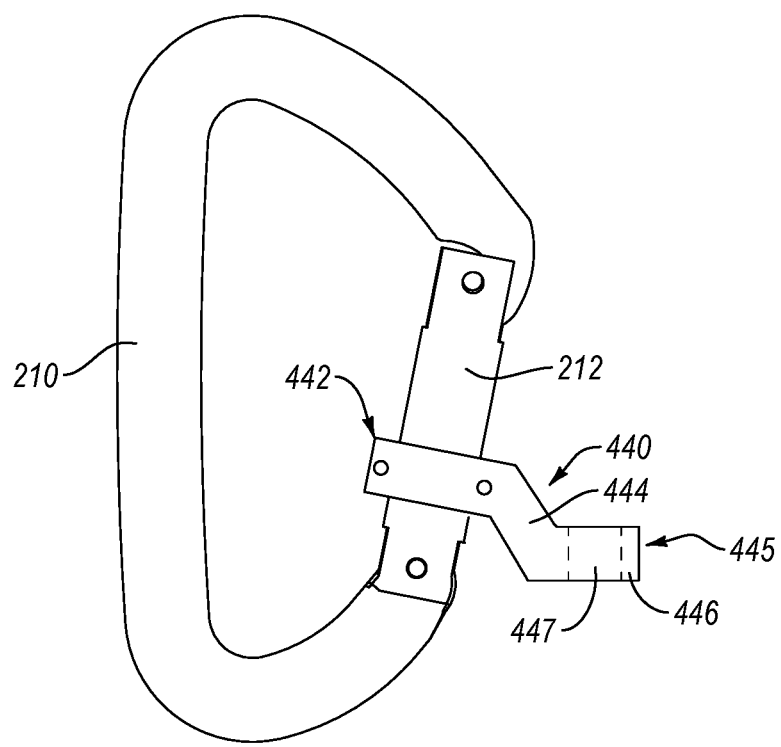
FIG. 4F is a side view of a carabiner retrieval device coupled to a carabiner, according to an embodiment.

FIG. 4F illustrates an embodiment carabiner retrieval device 440 coupled to a pivotable gate 212 of a carabiner 210. The carabiner retrieval device 440 includes a retention device 442, a neck 444, and a retrieval cord retention structure 445. The retention device 442 and neck 444 may include any retention devices and necks described elsewhere in the document. In some embodiments, the carabiner retrieval device 440 can be formed integrally with the gate 212 of the carabiner 210.

The retrieval cord retention structure 445 of the carabiner retrieval device 440 includes a ring 446 defining an opening 447 and distal to the retention device 442 or the gate 212. The ring 446 forms a plane that is substantially parallel to a plane formed by the retention device 442 and substantially perpendicular to a plane formed by the body of the carabiner 210. In other embodiments, the retrieval cord retention structure 445 includes more than one in the described orientation.

In operation, the carabiner retrieval device 440 coupled to the gate 212 of the carabiner 400 operates similar to the carabiner 210 and carabiner retrieval device 100 of the carabiner retrieval system 300. The retrieval cord 304, however, may be coupled to the retrieval cord retention structure 445, however, without an additional carabiner or closeable loop. Instead, the retrieval cord 304 may be coupled directly to the ring 446 through the opening 447 by tying the retrieval cord 304 to the ring 446 or looping the retrieval cord 304 through the ring 446 and closing the loop with a fastener.

Figure 4G:
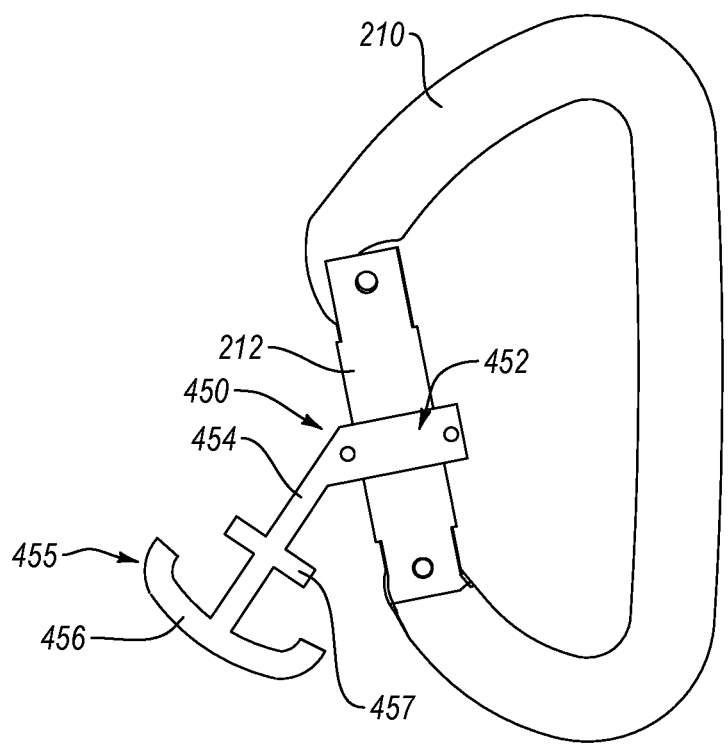
FIG. 4G is a side view of a carabiner retrieval device coupled to a carabiner, according to an embodiment.

FIG. 4G illustrates an embodiment carabiner retrieval device 450 coupled to a pivotable gate 212 of a carabiner 210. The carabiner retrieval device 450 includes a retention device 452, a neck 454, and a retrieval cord retention structure. The retention device 452 and neck 454 may include any retention devices and necks described elsewhere in the document. In some embodiments, the carabiner retrieval device 450 can be formed integrally with the gate 212 of the carabiner 210.

The retrieval cord retention structure of the carabiner retrieval device 450 comprises an anchor 455 distal to the retention device 452 or the gate 212. The anchor 455 includes two arms 456 curving or angled back towards the neck 454. The anchor 455 also includes a medial extension 457 positioned between the arms 456 and the neck 454. The medial extension can include a bar or cylinder protruding from the anchor 455. The anchor 455 of the retrieval cord retention structure is configured to allow a user to tie or otherwise secure a retrieval cord to the anchor 455. For example, when tied around the anchor 455, a portion of the retrieval cord may be looped around the anchor 455 between the medial extension 457 and the arms 456.

In operation, the carabiner retrieval device 450 coupled to the gate 212 of the carabiner 400 operates similar to the carabiner 210 and carabiner retrieval device 100 of the carabiner retrieval system 300. The retrieval cord 304, however, may be coupled directly to the retrieval cord retention structure, however, without an additional carabiner or closeable loop.

Figure 4H:
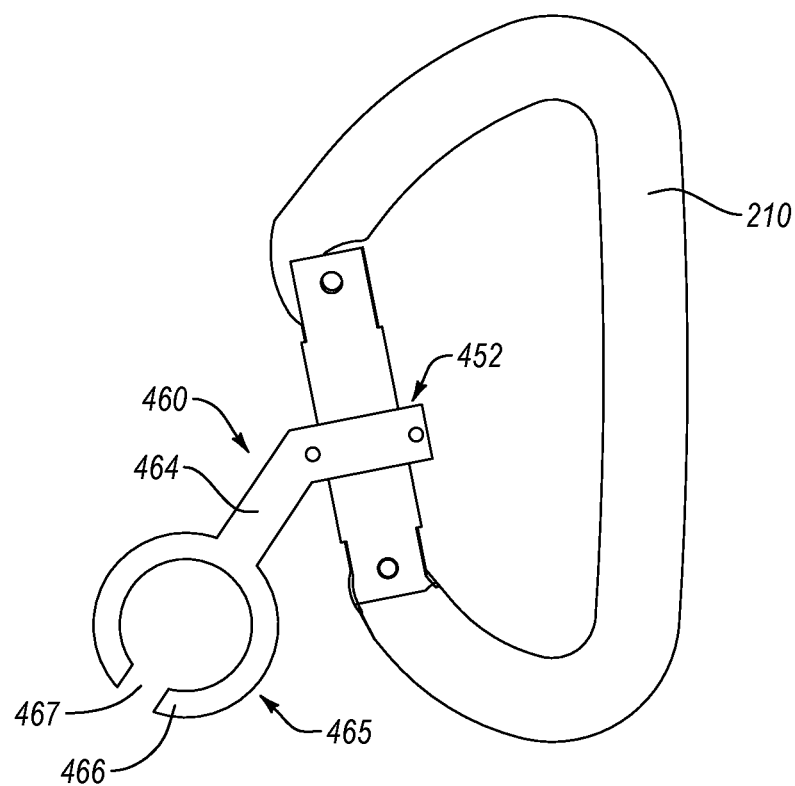
FIG. 4H is a side view of a carabiner retrieval device coupled to a carabiner, according to an embodiment.

FIG. 4H illustrates an embodiment carabiner retrieval device 460 coupled to a pivotable gate 212 of a carabiner 210. The carabiner retrieval device 460 includes a retention device 462, a neck 464, and a retrieval cord retention structure 465. The retention device 462 and neck 464 may include any retention devices and necks described elsewhere in the document. In some embodiments, the carabiner retrieval device 460 can be formed integrally with the gate 212 of the carabiner 210.

The retrieval cord retention structure 465 of the carabiner retrieval device 460 comprises a C-shaped retrieval cord retention structure 465 having two arms 466 curving or angled away from the neck 455. Terminating ends of the two arms 466 define a slot 467 distal to the neck 464, and the two arms define a reentrant opening. The retrieval cord retention structure 465 is configured to allow a user to tie or otherwise secure a retrieval cord directly to the retrieval cord retention structure 465. For example, when tied around the retrieval cord retention structure 465, a portion of the retrieval cord may be looped around one of the arms 466.

In operation, the carabiner retrieval device 460 coupled to the gate 212 of the carabiner 400 operates similar to the carabiner 210 and carabiner retrieval device 100 of the carabiner retrieval system 300. The retrieval cord 304, however, may be coupled directly to the retrieval cord retention structure 465, however, without an additional carabiner or closeable loop.

Various embodiments of carabiner retrieval devices also can include different configurations of retention devices on the carabiner retrieval device. FIG. 4D shows a partial view of a carabiner retrieval device 410 having a retention device 412. Although the neck and the retrieval cord retention structure are not shown in FIG. 4D, it is understood that the neck and the retrieval cord retention structure may include any neck and retrieval cord retention structure described herein.

Similar to the carabiner retrieval device 100, the retention device 412 of the carabiner retrieval device 410 includes a first bore 114 sized to receive a solid gate of a carabiner and a second bore 116 sized to receive one wire of a wire gate. Other embodiments of the retention device 412 may include only one of the first bore 114 or the second bore 116.

The retention device 412 also includes two pins, two bars or plates, a threaded shaft 411, and wingnut 414 or handle knob. A first pin 418 of the two pins extends through both the first arm member 112a and the second arm member 112b between the first bore 114 and the end of the retention device 412. A second pin 420 of the two pins extends through both the first arm member 112a and the second arm member 112b between the first bore 114 and the second bore 116. A first bar 416 or plate of the two bars or plates is fixedly coupled to first ends of the first pin 418 and the second pin 419 such that the first pin 418 and the second pin 419 cannot partially slide through the second bar 415. A second bar 415 or plate of the two bars or plates is slidably coupled to second ends of the first pin 418 and the second pin 419 distal to the first bar 416 or plate such that the first pin 418 and the second pin 419 can partially slide through the second bar 416. The threaded shaft 411 extends from the first arm member 112a through the bar 415, and the wingnut 414 is threadedly coupled the threaded shaft 411 with the second bar 415 between the wingnut 414 and the first arm member 112a.

In operation, as the wingnut 414 is rotated in a predetermined direction, the wingnut 414 moves along the threaded shaft 411 closer to the first arm member 112a. This movement of the wingnut 414 pushes the second bar 415 closer to the first arm member 112a until the second bar 415 interfaces the first arm member 112a. Continued rotation of the wingnut 414, then, tightens the retention device 412 around the gate of the carabiner in either the first bore 114 or the second bore 116. Once the carabiner retrieval device 410 is coupled to the gate 212, the carabiner retrieval device 410 operates similar to the carabiner 210 and carabiner retrieval device 100 of the carabiner retrieval system 300.

Figure 4I:
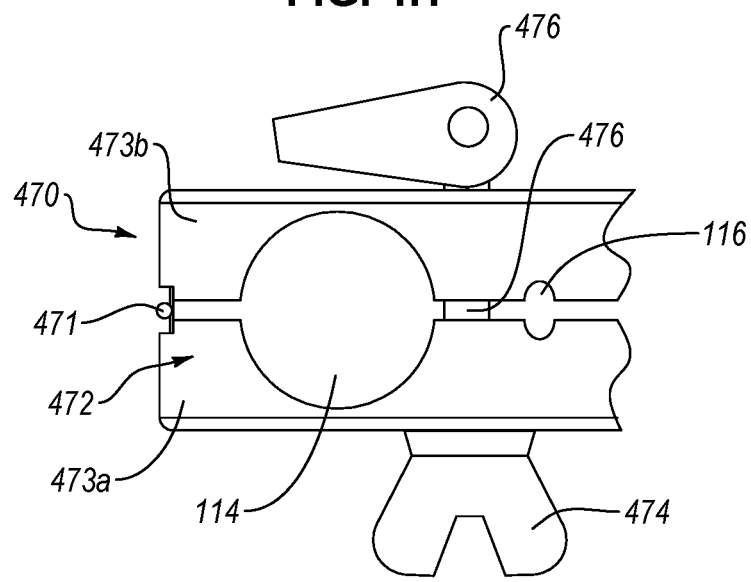
FIG. 4I is a top view of a retention device of a carabiner retrieval device, according to an embodiment.

FIG. 4I shows a partial view of a carabiner retrieval device 470 having a retention device 472. Although the neck and the retrieval cord retention structure are not shown in FIG. 4I, it is understood that the neck and the retrieval cord retention structure may include any neck and retrieval cord retention structure described herein.

Similar to the carabiner retrieval device 100, the retention device 472 of the carabiner retrieval device 470 includes a first bore 114 sized to receive a solid gate of a carabiner and a second bore 116 sized to receive one wire of a wire gate. Other embodiments of the retention device 472 may include only one of the first bore 114 or the second bore 116.

The retention device 472 also includes a pin 475, a release lever 476, and a wingnut 474 or handle knob. The pin 418 extends through both the first arm member 473a and the second arm member 473b between the first bore 114 and the second bore 116. The release lever 476 is threadedly coupled to a first end of the pin 475. The wingnut 474 is coupled to a second end of the first pin 418 distal to the release lever 476. The retention device 472 also can include a hinge 471 positioned between the bore 114 and an end of the retention device 472 or other suitable location. The hinge 471 can be coupled to the first arm 473a and the second arm 474b.

In operation, as the wingnut 474 is rotated in a predetermined direction, the wingnut 474 moves along the threaded shaft 411 closer to the first arm member 473a. This movement of the wingnut 414 pushes the first arm member 473a closer to the second arm member 473b until the first arm member 473a interfaces the second arm member 474a. The release lever 476 can then be moved from an open position (generally perpendicular to the retention device 472) to a tightened position (shown in FIG. 4I) to tighten the retention device 472 around the gate of the carabiner in either the first bore 114 or the second bore 116. Once the carabiner retrieval device 470 is coupled to the gate 212, the carabiner retrieval device 470 operates similar to the carabiner 210 and carabiner retrieval device 100 of the carabiner retrieval system 300.

Figure 4J:
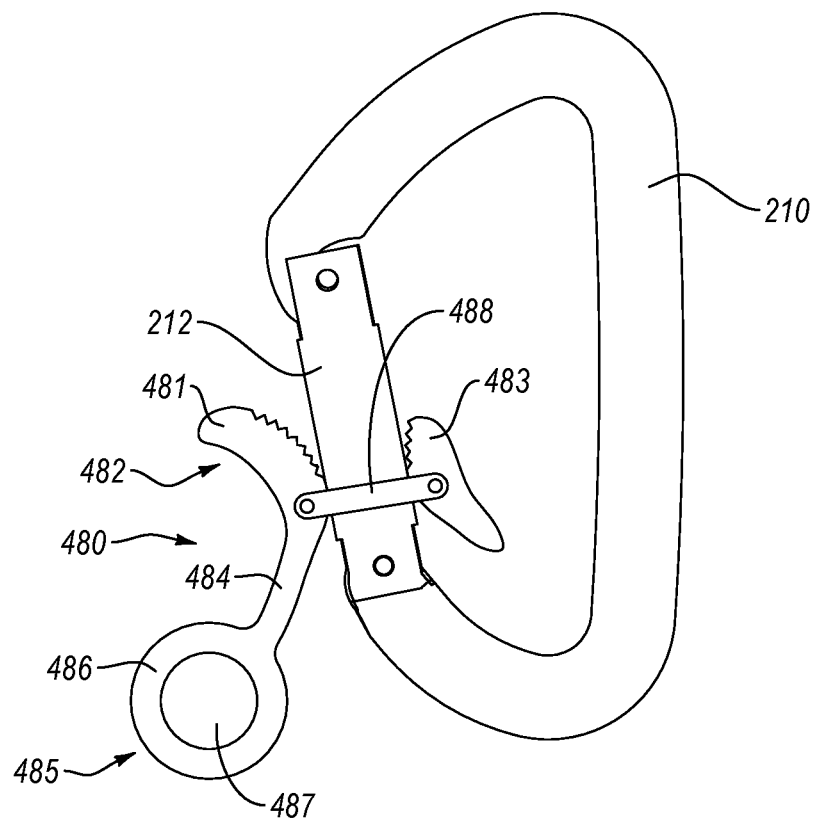
FIG. 4J is a side view of a carabiner retrieval device coupled to a carabiner, according to an embodiment.

FIG. 4J shows a carabiner retrieval device 480 having a retention device 482 coupled to the gate 212 of a carabiner.

The carabiner retrieval device 480 includes a neck 484 and a retrieval cord retention structure 485. The retrieval cord retention structure 485 includes at least one ring 486 defining at least one opening 487. The neck 484 and the retrieval cord retention structure 486 may include any neck and retrieval cord retention structure described herein.

The retention device 482 can include a cam assembly having a first lobe 481 extending from the neck distal to the retrieval cord retention structure 485, a second lobe 483, and one or more arms 488 coupling the first lobe 481 to the second lobe 483. The cam assembly may further include a spring or other biasing member biasing the first lobe 481 and the second lobe 483 away from one another until a force is exerted on the at least one ring 486. When the retrieval cord is coupled to the at least one ring 486, pulling the retrieval cord exerts a force on the at least one ring to tighten the first lobe 481 and the second lobe 483 on the gate 212. Once the carabiner retrieval device 470 is coupled to the gate 212, the carabiner retrieval device 470 operates similar to the carabiner 210 and carabiner retrieval device 100 of the carabiner retrieval system 300.

Figure 4K:
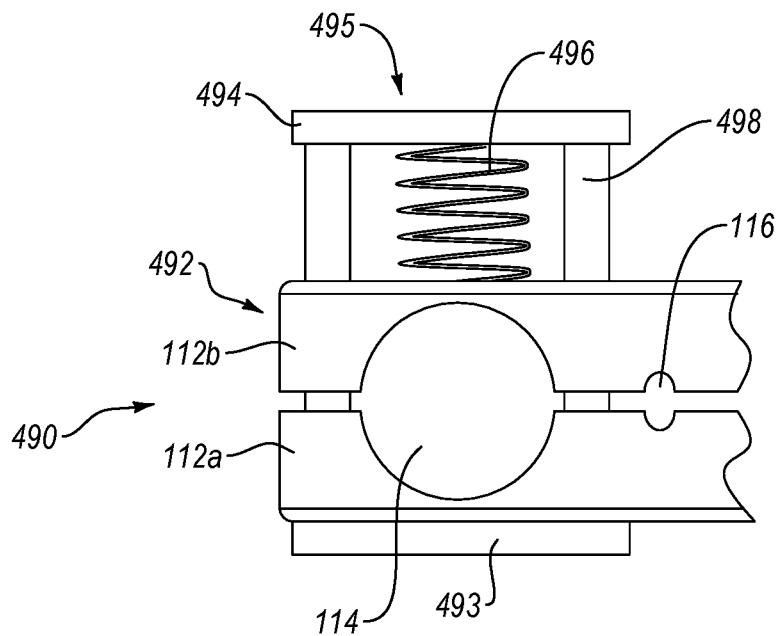
FIG. 4K is a top view of a retention device of a carabiner retrieval device, according to an embodiment.

FIG. 4K shows a partial view of a carabiner retrieval device 490 having a retention device 492. Although the neck and the retrieval cord retention structure are not shown in FIG. 4K, it is understood that the neck and the retrieval cord retention structure may include any neck and retrieval cord retention structure described herein. Similar to the carabiner retrieval device 100, the retention device 492 of the carabiner retrieval device 410 includes a first bore 114 sized to receive a solid gate of a carabiner and a second bore 116 sized to receive one wire of a wire gate. Other embodiments of the retention device 412 may include only one of the first bore 114 or the second bore 116.

The retention device 492 also includes a biasing assembly 495. The biasing assembly 495 can include two pins 497 and 498, a head 494, a base 493, and a biasing member 496. A first pin 497 of the two pins extends through both the first arm member 112a and the second arm member 112b between the first bore 114 and the end of the retention device 412. A second pin 498 of the two pins extends through both the first arm member 112a and the second arm member 112b between the first bore 114 and the second bore 116. The base 493 is coupled to first ends of the first pin 497 and the second pin 498, and the head 494 is coupled to second ends of the first pin 497 and the second pin 498. At least one of the base 493 or the head 494 is slidably coupled to the first pin 497 and the second pin 498 such that the first pin 497 and the second pin 498 can slide through the base 493 or the head 494. The biasing member 496 is coupled to the head 494 and the arm member 112b between the head 494 and the arm member 112b such that the biasing member 496 biases the head 494 away from the arm member 112b. This biasing force, then, tightens the retention device around the gate of the carabiner. In the embodiment shown in FIG. 4K, the biasing member 496 includes a spring. Other embodiments, however, may include other biasing members, such as a screw, a compressible resilient material, or other suitable biasing member.

In operation, the base 493 and the head 494 can be pushed together to loosen the first bore 114 or the second bore 116 and allow the gate of the carabiner to be inserted into or through the first bore 114 or the second bore 116. When the base 493 and the head 494 are released, the biasing member 496 biases the head 494 away from the arm member 112b to tighten the retention device 492 around the gate of the carabiner. Once the carabiner retrieval device 490 is coupled to the gate 212, the carabiner retrieval device 490 operates similar to the carabiner 210 and carabiner retrieval device 100 of the carabiner retrieval system 300.

Figure 5:
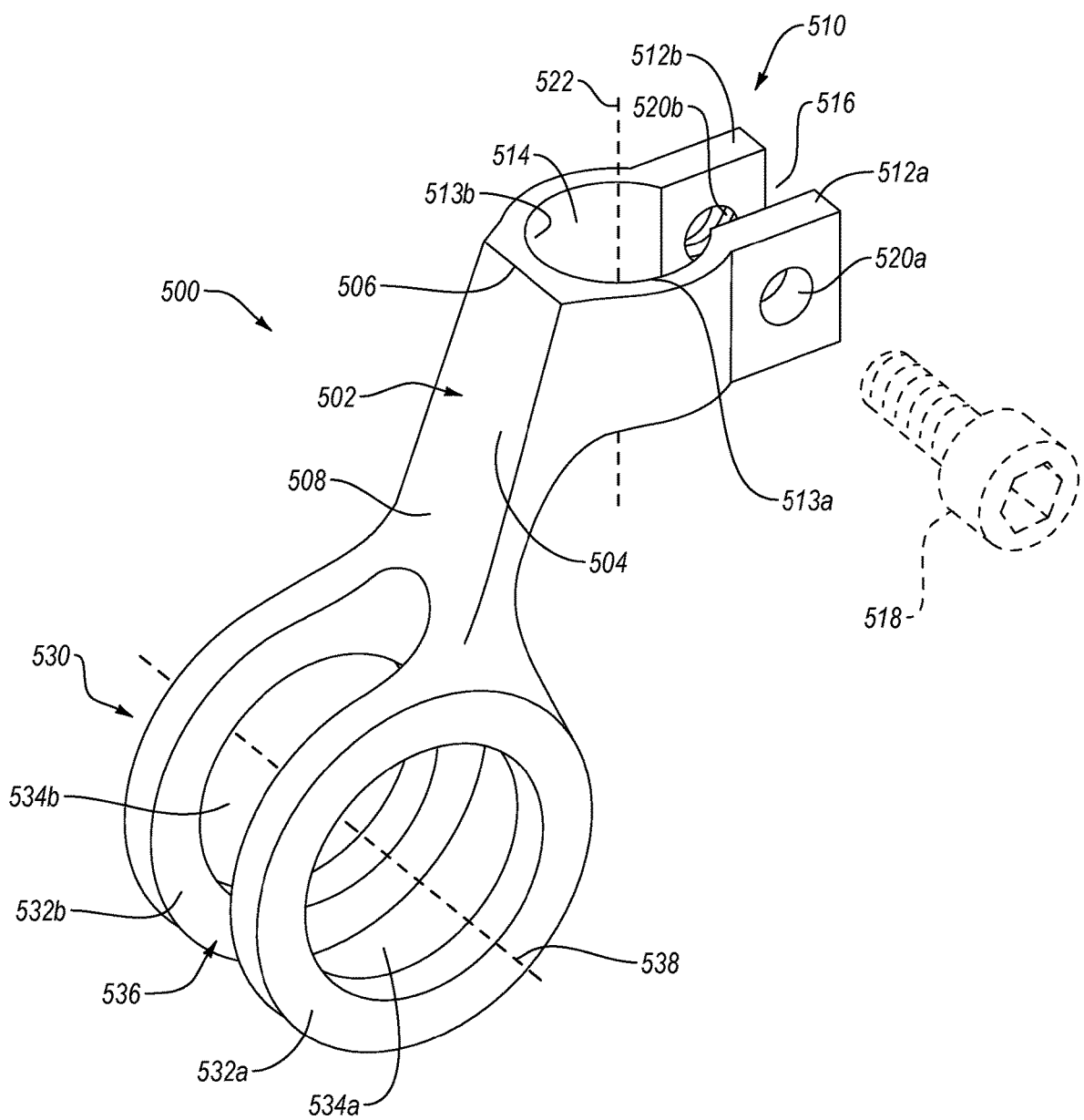
FIG. 5 is an isometric view of a carabiner retrieval device, according to an embodiment.

FIG. 5 shows another embodiment of a carabiner retrieval device 500. The carabiner retrieval device 500 includes a neck 504, a retention device 510, and a retrieval cord retention structure 530. The neck 502 exhibits a length 504, and includes a first end 506 spaced from a second end along the length 508 of the neck 502.

The retention device 510 is configured to be attached to a gate of a carabiner and extends from the first end 506 of the neck 502 at an obtuse angle relative to the length 504 of the neck 502. Similarly, the length 504 of the neck 502 may form an acute angle relative to an axis 522 of a bore 514 of the retention device. In other embodiments, the length 504 of the neck 102 may be substantially parallel to and spaced from the axis 522 of the bore 514 in the retention device 510.

In the carabiner retrieval device 500, the retention device 510 includes two arm members 512a and 512b. A first arm member 512a includes a first arc 513a, and a second arm member 512b includes a second arc 513b. The first arc 513a and the second arc 513b may arc away from the neck 502 to a slot 516 between the first arm member 512a and the second arm member 512b. The first arc 513a and the second arc 513b may arc towards one another proximate to the first end 506 of the neck 502 to form a continuous semi-circle that defines the bore 514. The bore 114 may be sized to receive a solid gate or a wire of a wire gate therein.

The retention device 510 also includes a bolt 518 extending through openings 520a and 520b in the first arm member 512a and the second arm member 512b, respectively. Opening 520b includes a threaded opening such that rotation of the bolt 518 in a first direction draws terminating ends of the first arm member 512a and the second arm member 512b closer together, while rotation of the bolt 518 in a second direction forces the first arm member 512a and the second arm member 512b further from one another. When the bolt 518 is rotated in a first direction to draw terminating ends of the first arm member 512a and the second arm member 512b closer together, the first arc 513a and the second arc 513b tighten around a gate positioned within the bore 114.

The retrieval cord retention structure 530 extends from the second end 508 of the neck 502 and is configured to retain a retrieval cord. When the retrieval cord is coupled to the retrieval cord retention structure 530 and the retrieval cord retention device 510 is attached to the gate of the carabiner, the gate opens responsive to the retrieval cord being pulled in a predetermined direction.

In some embodiments, the retrieval cord retention structure 530 includes at least one ring 532 defining an opening 534 sized for a closeable loop to be coupled thereto. In the carabiner retrieval device 500 shown in FIG. 5, the cord retention structure 530 includes two rings 532a and 532b. The two rings 532a and 532b each define a different opening 534a and 534b sized for a closeable loop to be coupled thereto. The closeable loop can include an additional carabiner or any other closeable loop. The retrieval cord retention structure also includes an axis 538 about which the rings 532a and 532b extend. The axis 538 is substantially perpendicular to the axis 522 of the bore 514. The carabiner retrieval device 500 shown in FIG. 5 also includes a slot 536 positioned between the two rings 532a and 532b. The slot 536 may be sized for the retrieval cord to be coupled to the closeable loop within the slot 536 between the two rings 532a and 532b.

The carabiner retrieval device 500 can be formed of one integral piece, or two device pieces coupled together. In contrast to the carabiner retrieval device 100, the carabiner retrieval device 500 shown in FIG. 5 includes one integrally formed piece.

In operation, a gate of a carabiner, such as gate 212 of carabiner 210, can be inserted into the bore 514 of the carabiner retrieval device 500. The arms 512a and 512b of the retention device 510 can then be tightened around the gate by rotating the bold 518 in a predetermined direction. Once the carabiner retrieval device 500 is coupled to the gate, the carabiner retrieval device 500 operates similar to the carabiner 210 and carabiner retrieval device 100 of the carabiner retrieval system 300.

Figure 6:
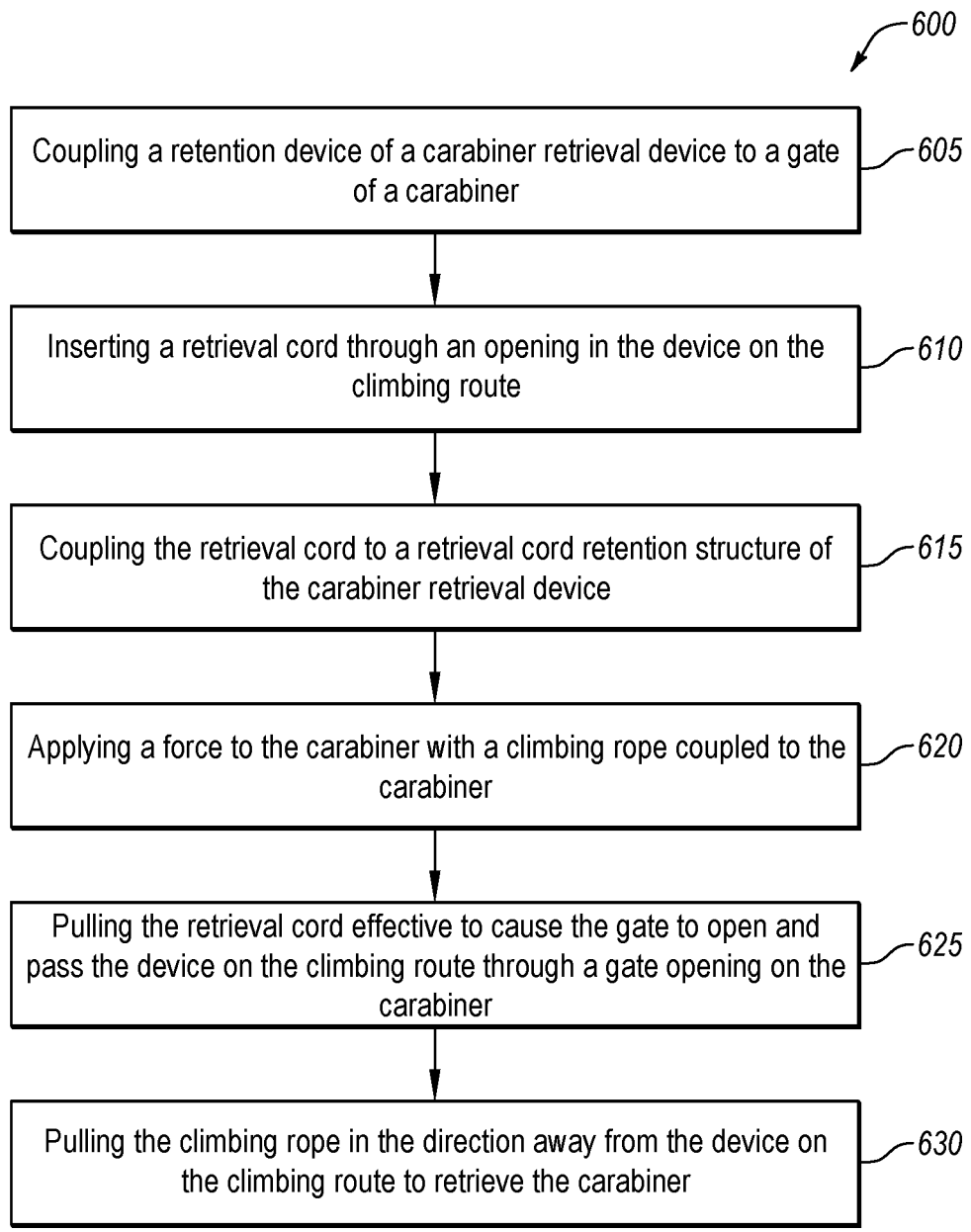
FIG. 6 is a flowchart of a method of retrieving a carabiner from a device on a climbing route, according to an embodiment.

One or more methods of retrieving a carabiner from a device on a climbing route are also disclosed. FIG. 6 is an example flowchart of a method 600 of retrieving a carabiner from a device on a climbing route. An example method may include one or more operations, functions, or actions as illustrated by one or more of blocks 605, 610, 615, 620, 625, and/or 630.

The method 600 allows a user (e.g., a climber), from the ground or other resting area, to remove a carabiner or other device from a device (such as a hanger) attached to a climbing route out of reach from the user. An example process may begin with block 605, which recites "coupling a retention device of a carabiner retrieval device to a gate of a carabiner." Block 605 may be followed by block 610, which recites "inserting a retrieval cord through an opening in the device on the climbing route." Block 610 may be followed by block 615, which recites "coupling the retrieval cord to a retrieval cord retention structure of the carabiner retrieval device." Block 615 may be followed by block 620, which recites "applying a force to the carabiner with a climbing rope coupled to the carabiner." Block 620 may be followed by block 625, which recites "pulling the retrieval cord effective to cause the gate to open and pass the device on the wall through a gate opening on the carabiner." Block 625 may be followed by block 630, which recites "pulling the climbing rope in the direction away from the device on the climbing route to retrieve the carabiner."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Block 605 recites "coupling a retention device of a carabiner retrieval device to a gate of a carabiner." The carabiner may have previously been coupled to the device on the climbing route. For example, the carabiner may have been hooked to a hanger or other device on a rock wall during the process of climbing the rock wall. The carabiner retrieval device in block 605 of the method 600 can include one of a number of different carabiner retrieval devices described herein.

For example, the carabiner retrieval device in block 605 of the method 600 can include the carabiner retrieval device 100 (FIGS. 1A-1D), 410 (FIG. 4D), 430 (FIG. 4E), 440 (FIG. 4F), 450 (FIG. 4G), 460 (FIG. 4H), 470 (FIG. 4I), or 500 (FIG. 5). In these and other embodiments, coupling a retention device of a carabiner retrieval device to a gate of the carabiner can include inserting at least a portion of the gate into a bore positioned on the retention device and tightening the bore around the at least the portion of the gate with one or more screws extending through the two arm members. If the gate of the carabiner is a wire gate, inserting at least a portion of the gate into a bore positioned on the retention device can include inserting one wire of two wires of the gate into the bore positioned on the carabiner. If the gate of the carabiner is a solid gate, inserting at least a portion of the gate into a bore positioned on the retention device can include inserting the solid gate into the bore positioned on the carabiner.

The carabiner retrieval device in block 605 of the method 600 alternatively can include the carabiner retrieval device 480 (FIG. 4J). In this and other embodiments, coupling a retention device of a carabiner retrieval device to a gate of the carabiner can include inserting at least a portion of the gate between two lobes of a cam assembly on the retention device and tightening the two lobes against the gate.

The carabiner retrieval device in block 605 of the method 600 alternatively can include the carabiner retrieval device 490 (FIG. 4K). In this and other embodiments, coupling a retention device of a carabiner retrieval device to a gate of the carabiner can include (1) expanding a bore positioned on the retention device by pressing a head and a base of biasing assembly closer together, (2) inserting at least a portion of the gate into the bore positioned, and (3) releasing the head and the base, the head being biased away from the base to tighten the bore around the at least a portion of the gate.

In other embodiments of the method 600, the carabiner retention device is formed integrally with the gate of the carabiner, and the action of block 605 may be bypassed. For example, the method 600 can utilize the carabiner retrieval device formed integrally with the gate 402 (FIG. 4A) or 422 (FIGS. 4B and 4C), and thus bypass the action of block 605.

Block 610 recites "inserting a retrieval cord through an opening in the device on the climbing route." For example, a retrieval cord can be inserted through an opening in a hanger attached to a climbing route, as shown in FIG. 3A. The retrieval cord may be inserted or fed through the opening in the device from the side of the device that is opposite of the gate of the carabiner coupled to the device.

Block 615 recites "coupling the retrieval cord to a retrieval cord retention structure of the carabiner retrieval device." The carabiner retrieval device in block 615 of the method 600 can include one of a number of different carabiner retrieval devices described herein.

For example, the carabiner retrieval device in block 615 of the method 600 can include the retrieval cord retention structure 130 (FIGS. 1A-D), 405 (FIG. 4A), 425 FIGS. 4B and 4C), 485 (FIG. 4J), or 530 (FIG. 5). In these and other embodiments, coupling the retrieval cord to a retrieval cord retention structure of the carabiner retrieval device can include coupling a closeable loop to the retrieval cord and at least one ring of the retrieval cord retention structure. In these and other embodiments, coupling the retrieval cord to a retrieval cord retention structure of the carabiner retrieval device can include coupling a closeable loop to the retrieval cord and two rings of the retrieval cord retention structure such that the retrieval cord is coupled to the closeable loop between the two rings. The closeable loop can, for example, include an additional carabiner.

In some embodiments, the carabiner retrieval device of block 615 of the method 600 can include the retrieval cord retention structure 434 (FIG. 4E), 445 (FIG. 4F), or 455 (FIG. 4G). In these and other embodiments, coupling the retrieval cord to a retrieval cord retention structure of the carabiner retrieval device can include coupling the retrieval cord directly to retrieval cord retention structure (such as a knob, a ring, an anchor, or a C-shaped structure).

Block 620 recites "applying a force to the carabiner with a climbing rope coupled to the carabiner." For example, a climbing rope may be directly or indirectly coupled to the carabiner attached to the device on the climbing route. When the climbing rope is indirectly coupled to the carabiner attached to the device on the climbing route, the climbing rope may be tied to an additional carabiner that is either hooked to directly to the carabiner attached to the device or, alternatively, coupled to a strap that is coupled to the carabiner attached to the device on the climbing route.

The force may be applied to the carabiner in a direction away from the device on the climbing route. For example, after a climber repels to the ground below the device attached to the climbing route, a user (such as the climber) may, from the ground, pull the climbing rope downward in a direction that is away from the device on the climbing route.

Block 625 recites "pulling the retrieval cord effective to cause the gate to open and pass the device on the wall through a gate opening on the carabiner." The retrieval cord may be pulled while the force is applied to the carabiner. For example, from the ground or other resting area, a user may pull the climbing rope with one hand and then simultaneously pull the retrieval cord with the other hand to open the gate of the carabiner. Once the gate of the carabiner is opened, at least some of the force being applied to the carabiner from the climbing rope can be released to rotate the carabiner to a position to decouple from the device on the climbing route. Passing the device on the wall through the gate opening on the carabiner is effective to uncouple the carabiner from the device on the climbing route.

Block 630 recites "pulling the climbing rope in the direction away from the device on the climbing route to retrieve the carabiner." After the carabiner is uncoupled from the device on the climbing route, the user on the ground may release the retrieval cord and continue to pull climbing rope downward. As the climbing rope is pulled downward, the retrieval cord slides through the opening in the device on the wall and eventually falls to the ground.

Although the carabiner retrieval devices, systems, and methods described above have been discussed in the context of climbing applications, in other embodiments, the carabiner retrieval devices, systems, and methods disclosed herein are not limited to such use and may be used for many different applications, if desired, without limitation. Thus, such carabiner retrieval devices, systems, and methods are not limited for use with climbing applications and may be used with various mechanical systems, without limitation.

While various aspects and embodiments have been disclosed herein, other aspects and embodiments are contemplated. The various aspects and embodiments disclosed herein are for purposes of illustration and are not intended to be limiting.

What is claimed is:

1. A carabiner retrieval device, comprising:
   a neck having a length, the neck including a first end spaced from a second end along the length;
   a retention device extending from the first end of the neck at an obtuse angle relative to the length of the neck, the retention device configured to be attached to a gate of a carabiner; and
   a retrieval cord retention structure extending from the second end of the neck, the retrieval cord retention structure configured to retain a retrieval cord;
   wherein when the retrieval cord is coupled to the retrieval cord retention structure and the retrieval cord retention device is attached to the gate of the carabiner, the gate opens responsive to the retrieval cord being pulled in a predetermined direction.

2. The carabiner retrieval device of claim 1, wherein the retrieval cord retention structure includes at least one ring defining an opening sized for a closeable loop to be coupled thereto.

3. The carabiner retrieval device of claim 1, wherein the retrieval cord retention structure includes two rings each of which defines an opening sized for a closeable loop to be coupled thereto, and a slot positioned between the two rings.

4. The carabiner retrieval device of claim 1, wherein the retention device includes:
   two arm members;
   a first bore defined at least partially by the two arm members, the first bore sized to receive at least a portion of the gate therein; and
   a first tightening screw extending through the two arm members and configured to tighten the first bore around the at least a portion of the gate.

5. The carabiner retrieval device of claim 4, wherein the retention device further comprises:
   a second bore defined by the two arm members, the second bore being sized smaller than the first bore to receive one wire of two wires of a wire gate of the carabiner; and
   a second tightening screw extending through the two arm members and configured to tighten the second bore around the one wire of the wire gate,
   wherein the first bore is sized to receive a solid gate of the carabiner.

6. The carabiner retrieval device of claim 4, wherein the retention device includes a hinge coupled to the first arm and the second arm between the first bore and an end of the retention device, the first tightening screw being positioned between the first bore and the neck.

7. The carabiner retrieval device of claim 1, wherein:
   the retrieval cord retention structure includes at least one ring defining an opening and a first axis about which the at least one ring extends and sized for a closeable loop to be coupled thereto; and
   the retention device includes a first bore having a second axis substantially perpendicular to the first axis, the first bore sized to receive at least a portion of the gate therein.

8. The carabiner retrieval device of claim 1, further comprising:
   a first device piece and a second device piece;
   wherein the retrieval cord retention structure includes:
      a first ring on the first device piece and defining a first opening and a first axis about which the first ring extends and sized for a closeable loop to be coupled thereto;
      a second ring on the second device piece and defining a second opening and the first axis about which the second ring extends and sized for the closeable loop to couple thereto;
      a slot positioned between the first ring and the second ring;
   wherein the neck includes a portion of the first device piece interfacing with a portion of the second device piece; and
   wherein the retention device includes:
      a first arm member on the first device piece;
      a second arm member on the second device piece;
      a first bore defined by the first arm and the second arm, the first bore being sized to receive a solid gate of the carabiner therein and having a second axis substantially perpendicular to the first axis;
a second bore defined by the first arm and the second arm, the second bore being sized smaller than the first bore to receive one wire of two wires of a wire gate of the carabiner and positioned between the first bore and the neck;
a first tightening screw extending through the two arm members and configured to tighten the first bore around the solid gate, the first tightening screw being positioned between the first bore and an end of the retention device; and
a second tightening screw extending through the two arm members and configured to tighten the second bore around the one wire of the wire gate, the second tightening screw being positioned between the first bore and the second bore.

9. The carabiner retrieval device of claim 1, wherein the retrieval cord retention structure includes a knob distal to the retention device.

10. The carabiner retrieval device of claim 1, wherein the retrieval cord retention structure includes an anchor distal to the retention device.

11. The carabiner retrieval device of claim 1, wherein the retention device includes a cam lock assembly configured to couple to a gate of a carabiner.

12. The carabiner retrieval device of claim 1, wherein the retention device includes:
two arm members;
a first bore defined at least partially by the two arm members, the first bore sized to receive at least a portion of the gate therein; and
a biasing assembly including a biasing member configured to tighten the first bore around the at least a portion of the gate.

13. The carabiner retrieval device of claim 12, wherein the biasing member includes a spring positioned between the retention device and a head of the biasing assembly.

14. A carabiner retrieval system, comprising:
a carabiner including a gate;
a carabiner retrieval device including:
a neck having a length, the neck including a first end spaced from a second end along the length;
a retention device extending from the first end of the neck at an obtuse angle relative to the length of the neck, the retention device configured to be attached to a gate of a carabiner; and
a retrieval cord retention structure extending from the second end of the neck, the retrieval cord retention structure configured to retain a retrieval cord; and
a retrieval cord coupled to the retrieval cord retention structure, wherein the gate opens responsive to the retrieval cord being pulled in a predetermined direction.

15. The carabiner retrieval system of claim 14, wherein the retrieval cord retention structure includes at least one ring defining an opening and a closeable loop coupled to the at least one ring through the opening, the retrieval cord being coupled to the closeable loop.

16. The carabiner retrieval system of claim 14, wherein the retrieval cord retention structure includes:
two rings each of which defines an opening;
a slot positioned between the two rings; and
a closeable loop coupled to the two rings through the opening of each of the two rings, the retrieval cord being coupled to the closeable loop in the slot between the two opposing rings.

17. The carabiner retrieval system of claim 14, wherein the gate includes a solid gate and the retention device includes:
two arm members;
a first bore defined at least partially by the two arm members, the first bore interfacing and receiving a portion of the solid gate therein; and
a first tightening screw extending through the two arm members and configured to tighten the first bore around the at least a portion of the gate.

18. The carabiner retrieval system of claim 17, wherein the retention device includes a hinge coupled to the first arm and the second arm between the first bore and an end of the retention device, the first tightening screw being positioned between the first bore and the neck.

19. The carabiner retrieval system of claim 14, wherein the gate of the carabiner includes a wire gate and the retention device further includes:
a second bore defined by the two arm members, the second bore receiving one wire of two wires of the wire gate of the carabiner; and
a second tightening screw extending through the two arm members and configured to tighten the second bore around the one wire of the wire gate.

20. The carabiner retrieval system of claim 14, wherein:
the retrieval cord retention structure includes:
at least one ring defining an opening and a first axis about which the ring extends; and
a closeable loop coupled to the at least one ring through the opening; and
the retention device includes a first bore having a second axis substantially perpendicular to the first axis, the first bore sized to receive at least a portion of the gate therein.

21. The carabiner retrieval system of claim 14, further comprising:
a first device piece and a second device piece;
wherein the retrieval cord retention structure includes:
a first ring on the first device piece and defining a first opening and a first axis about which the first ring extends;
a second ring on the second device piece and defining a second opening and the first axis about which the second ring extends;
a closeable loop coupled to the first ring and the second ring through the first opening and the second opening; and
a slot positioned between the first ring and the second ring, the retrieval cord being coupled to the closeable loop in the slot between the first retrieval cord member and the second retrieval cord member;
wherein the neck includes a portion of the first device piece interfacing a portion of the second device piece; and
wherein the retention device includes:
a first arm member on the first device piece;
a second arm member on the second device piece;
a first bore defined by the first arm member and the second arm member, the first bore interfacing and receiving the gate of the carabiner therein and having a second axis substantially perpendicular to the first axis; and
a first tightening screw extending through the two arm members and configured to tighten the first bore around the solid gate, the first tightening screw being positioned between the first bore and an end of the retention device.

22. A method of retrieving a carabiner from a device on a climbing route, the method comprising:
- coupling a retention device of a carabiner retrieval device to a gate of the carabiner coupled to the device on the climbing route;
- inserting a retrieval cord through an opening in the device on the climbing route;
- coupling the retrieval cord to a retrieval cord retention structure of the carabiner retrieval device;
- applying a force to the carabiner in a direction away from the device on the climbing route with a climbing rope coupled to the carabiner;
- while applying the force to the carabiner, pulling the retrieval cord effective to cause the gate to open and then pass the device on the climbing route through a gate opening on the carabiner to uncouple the carabiner from the device on the climbing route; and
- pulling the climbing rope in the direction away from the device on the climbing route to retrieve the carabiner, the retrieval cord sliding through the device on the climbing route as the climbing rope is pulled in the direction away from the device on the climbing route.

23. The method of claim 22, wherein coupling the retrieval cord to a retrieval cord retention structure of the carabiner retrieval device includes:
- coupling a closeable loop to the retrieval cord and at least one ring of the retrieval cord retention structure.

24. The method of claim 22, wherein coupling the retrieval cord to a retrieval cord retention structure of the carabiner retrieval device includes:
- coupling a closeable loop to the retrieval cord and two rings of the retrieval cord retention structure such that the retrieval cord is coupled to the closeable loop between the two rings.

25. The method of claim 22, wherein coupling a retention device of a carabiner retrieval device to a gate of the carabiner includes:
- inserting at least a portion of the gate into a first bore positioned on the retention device, the first bore being defined at least partially by two arm members of the retention device; and
- tightening the first bore around the at least the portion of the gate with one or more screws extending through the two arm members.

26. A carabiner, comprising:
- a carabiner body partially defining an inner area of the carabiner; and
- a pivotable gate biased to a closed position and partially defining the inner area of the carabiner in the closed position, the gate including a retrieval cord retention structure configured to couple a retrieval cord to the carabiner and a neck extending away from the inner area of the carabiner and positioned between the inner area and the retrieval cord retention structure, wherein when the retrieval cord is coupled to the retrieval cord retention structure, the gate opens responsive to the retrieval cord being pulled in a predetermined direction.

27. The carabiner of claim 26, wherein the retrieval cord retention structure includes at least one ring defining an opening sized for a closeable loop to be coupled thereto.

28. The carabiner of claim 26, wherein the retrieval cord retention structure includes two rings each of which defines an opening sized for a closeable loop to be coupled thereto and a slot positioned between the two rings.

29. The carabiner of claim 26, wherein the retrieval cord retention structure includes a knob distal to the inner area of the carabiner.

30. The carabiner of claim 26, wherein the retrieval cord retention structure includes an anchor distal to the inner area of the carabiner.

* * * * *